(12) United States Patent
Loehr et al.

(10) Patent No.: US 10,178,632 B2
(45) Date of Patent: Jan. 8, 2019

(54) POWER HEADROOM REPORTING FOR MTC DEVICES IN ENHANCED COVERAGE MODE

(71) Applicant: Panasonic Intellectual Property Corporation of America, Torrance, CA (US)

(72) Inventors: Joachim Loehr, Hessen (DE); Hidetoshi Suzuki, Kanagawa (JP); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 208 days.

(21) Appl. No.: 15/217,463

(22) Filed: Jul. 22, 2016

(65) Prior Publication Data
US 2016/0330698 A1    Nov. 10, 2016

Related U.S. Application Data

(63) Continuation of application No. PCT/JP2015/000944, filed on Feb. 25, 2015.

(30) Foreign Application Priority Data

Mar. 12, 2014 (EP) .................................... 14159293

(51) Int. Cl.
*H04W 52/36* (2009.01)
*H04W 52/24* (2009.01)
(Continued)

(52) U.S. Cl.
CPC ......... *H04W 52/365* (2013.01); *H04L 5/0055* (2013.01); *H04W 4/70* (2018.02);
(Continued)

(58) Field of Classification Search
CPC .............................. H04W 52/00; H04W 72/00
See application file for complete search history.

(56) References Cited

U.S. PATENT DOCUMENTS

| 2011/0134774 A1* | 6/2011 | Pelletier | H04W 52/365 370/252 |
| 2012/0113848 A1 | 5/2012 | Kim et al. | |

(Continued)

FOREIGN PATENT DOCUMENTS

| EP | 2595425 | 5/2013 |
| WO | 2015/116732 A1 | 8/2015 |

OTHER PUBLICATIONS

Panasonic, (E)PDCCH coverage enhancement for MTC, 3GPP TSG RAN WG1 Meeting #75, R1-133594, Nov. 2013.*
(Continued)

*Primary Examiner* — Andrew Lai
*Assistant Examiner* — Sumitra Ganguly
(74) *Attorney, Agent, or Firm* — Seed IP Law Group LLP

(57) ABSTRACT

The present disclosure relates various embodiments for improving power headroom reporting for UEs being in an enhanced coverage mode. The UE may be configured to always transmit a virtual power headroom report to the eNB, when operating in the enhanced coverage mode. Or, the UE may be configured to always transmit a virtual power headroom report to the eNB, when operating in the enhanced coverage mode and at the same time being power limited. Moreover, the UE may determine a repetition level for transmissions in the uplink and/or may determine a repetition level for transmissions in the downlink. The power headroom report can then be used to transport this information (either one of, or both of, the uplink/downlink repetition levels), by using predefined codepoints in the power headroom report.

16 Claims, 12 Drawing Sheets

(51) Int. Cl.
*H04L 5/00* (2006.01)
*H04W 72/04* (2009.01)
*H04W 4/70* (2018.01)

(52) U.S. Cl.
CPC ....... *H04W 52/241* (2013.01); *H04W 52/246* (2013.01); *H04W 52/367* (2013.01); *H04W 72/04* (2013.01)

(56) References Cited

U.S. PATENT DOCUMENTS

2013/0225228 A1* 8/2013 Park .................. H04W 24/10
455/522
2015/0117233 A1* 4/2015 Wong .................. H04W 4/70
370/252

OTHER PUBLICATIONS

CATT, Impact Analysis of Extended Coverage, 3GPP TSG WG2 Meeting #85, R2-140073, Feb. 2014.*
Communication pursuant to Article 94(3) EPC, dated Feb. 24, 2017, for corresponding European Application No. 14 159 293.1-1875, 5 pages.
International Search Report of PCT application No. PCT/JP2015/000944 dated Jun. 2, 2015.
3GPP TSG-RAN WG1Meeting #75 "(E)PDCCH coverage enhancement for MTC" R1-135394, 2013.
3GPP TSG-RAN2 #85Meeting "Impact of Enhanced coverage on other physical Channels" R2-140526, 2014.
3GPP TSG-RAN WG2 Meeting #72 "Indication of virtual PHR" R2-106204, 2010.
3GPP TSG-RAN WG2 Meeting #85 "Impact Analysis of Extended Coverage" R2-140073, 2014.
3GPP TS 36.211 v8.9.0, "Physical Channels and Modulation (Release 8)" 2009.
3GPP TS 36.213 v8.8.0, "Physical layer procedures (Release 8)" 2009.
3GPP TS 36.133 v8.7.0, "Requirements for support of radio resource management (Release 8)" 2009.
3GPP TS 36.101 v8.7.0, "User Equipment (UE) radio transmission and reception (Release 8)" 2009.
3GPP TS 36.321 v10.0.0, "Medium Access Control (MAC) protocol specification (Release 10)" 2010.
Communication pursuant to Article 94(3) EPC, dated Feb. 7, 2018, for the related European Patent Application No. 14 159 293.1-1219, 6 pages.

* cited by examiner

FIG. 8

| C7 | C6 | C5 | C4 | C3 | C2 | C1 | R |
|---|---|---|---|---|---|---|---|
| R | V | \multicolumn{6}{c|}{PH (TYPE 2, PCell)} |
| R | R | \multicolumn{6}{c|}{$P_{CMAX, c}$ 1} |
| R | V | \multicolumn{6}{c|}{PH (TYPE 1, PCell)} |
| R | R | \multicolumn{6}{c|}{$P_{CMAX, c}$ 2} |
| R | V | \multicolumn{6}{c|}{PH (TYPE 1, Scell 1)} |
| R | R | \multicolumn{6}{c|}{$P_{CMAX, c}$ 3} |

...

| R | V | PH (TYPE 1, Scell n) |
|---|---|---|
| R | R | $P_{CMAX, c}$ m |

| $C_7$ | $C_6$ | $C_5$ | $C_4$ | $C_3$ | $C_2$ | $C_1$ | R |
|---|---|---|---|---|---|---|---|
| R | V | PH (TYPE 2, PCell) ||||||
| R | R | $P_{CMAX, c}$ 1 ||||||
| R | V | PH (TYPE 1, PCell) ||||||
| R | R | $P_{CMAX, c}$ 2 ||||||
| R | V | PH (TYPE 1, Scell 1) ||||||
| R | R | $P_{CMAX, c}$ 3 ||||||
| ... |||||||||
| R | V | PH (TYPE 1, Scell n) ||||||
| R | R | $P_{CMAX, c}$ m ||||||

R ← POWER LIMITATION INDICATOR

FIG. 14

| PH | POWER HEADROOM LEVEL |
|---|---|
| 0 | PUSCH REPETITION LEVEL 1 (10rep.) |
| 1 | PUSCH REPETITION LEVEL 2 (20rep.) |
| 2 | PUSCH REPETITION LEVEL 3 (50rep.) |
| 3 | PUSCH REPETITION LEVEL 4 (80rep.) |
| ... | ... |
| 60 | POWER_HEADROOM_60 |
| 61 | POWER_HEADROOM_62 |
| 62 | POWER_HEADROOM_62 |
| 63 | POWER_HEADROOM_63 |

FIG. 15

| PH | POWER HEADROOM LEVEL |
|---|---|
| 0 | PDSCH REPETITION LEVEL 1 (10rep.) |
| 1 | PDSCH REPETITION LEVEL 2 (20rep.) |
| 2 | PDSCH REPETITION LEVEL 3 (50rep.) |
| 3 | PDSCH REPETITION LEVEL 4 (80rep.) |
| ... | ... |
| 60 | POWER_HEADROOM_60 |
| 61 | POWER_HEADROOM_62 |
| 62 | POWER_HEADROOM_62 |
| 63 | POWER_HEADROOM_63 |

FIG. 16
| PH | POWER HEADROOM LEVEL |
|---|---|
| 0 | PDSCH REPETITION LEVEL 1 (10rep.) |
| 1 | PDSCH REPETITION LEVEL 2 (20rep.) |
| 2 | PDSCH REPETITION LEVEL 3 (50rep.) |
| 3 | PDSCH REPETITION LEVEL 4 (80rep.) |
| 4 | PUSCH REPETITION LEVEL 1 (10rep.) |
| 5 | PUSCH REPETITION LEVEL 2 (20rep.) |
| 6 | PUSCH REPETITION LEVEL 3 (50rep.) |
| 7 | PUSCH REPETITION LEVEL 4 (80rep.) |
| ... | ... |
| 60 | POWER_HEADROOM_60 |
| 61 | POWER_HEADROOM_62 |
| 62 | POWER_HEADROOM_62 |
| 63 | POWER_HEADROOM_63 |
FIG. 17
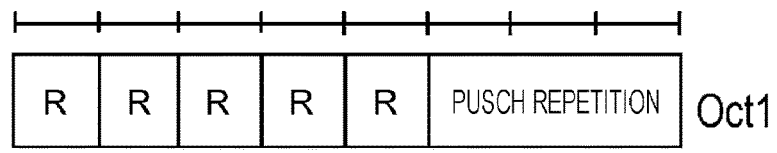
FIG. 18
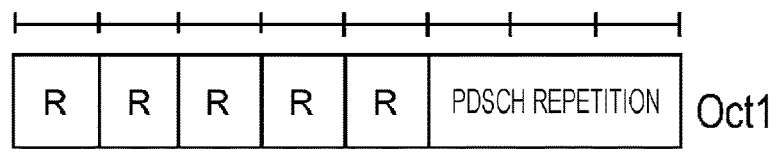
FIG. 19
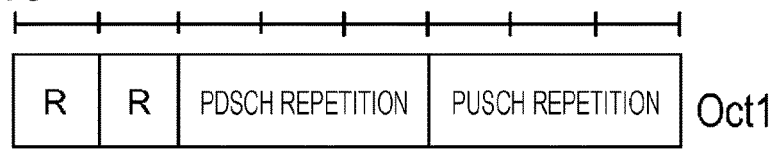

POWER HEADROOM REPORTING FOR MTC DEVICES IN ENHANCED COVERAGE MODE

BACKGROUND

1. Technical Field

The present disclosure relates to methods for improved power headroom reporting in case the user equipment is determined to be operating in an enhanced coverage mode. The present disclosure is also providing a mobile station and base stations for participating in and for performing the methods described herein.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access is adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access is adopted in the uplink, since provisioning of wide area coverage is prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PLY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot includes the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N^{DL}_{RB} * N^{RB}_{SC}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g. 7 OFDM symbols) and $N^{RB}_{SC}$ consecutive subcarriers in the frequency domain as exemplified in FIG. 4 (e.g. 12 subcarriers for a component carrier). In 3GPP LTE (Release 8), a physical resource block thus consists of $N^{DL}_{symb} * N^{RB}_{SC}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N^{RB}_{SC}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources. Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

For each SCell the usage of uplink resources by the UE, in addition to the downlink ones is configurable; the number of DL SCCs configured is therefore always larger or equal to the number of UL SCCs, and no SCell can be configured for usage of uplink resources only.

The uplink PCell is used for transmission of Layer 1 uplink control information.

The downlink PCell cannot be de-activated, unlike SCells.

From UE perspective, each uplink resource only belongs to one serving cell.

The number of serving cells that can be configured depends on the aggregation capability of the UE.

Re-establishment is triggered when the downlink PCell experiences Rayleigh fading (RLF), not when downlink SCells experience RLF.

The downlink PCell cell can change with handover (i.e. with security key change and RACH procedure).

Non-access stratum information is taken from the downlink PCell.

PCell can only be changed with handover procedure (i.e. with security key change and RACH procedure).

PCell is used for transmission of PUCCH.

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g. a subframe of 0.5 ms, onto which coded information bits are mapped. It should be noted that a subframe, also referred to as transmission time interval (TTI), is the smallest time interval for user data transmission. It is however possible to assign a frequency resource $BW_{grant}$ over a longer time period than one TTI to a user by concatenation of subframes.

UL Scheduling Scheme for LTE

The uplink scheme allows for both scheduled access, i.e. controlled by eNB, and contention-based access.

In case of scheduled access, the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where a UE is making a contention-based access is for example the random access, i.e. when a UE is performing initial access to a cell or for requesting uplink resources.

For the scheduled access Node B scheduler assigns a user a unique frequency/time resource for uplink data transmission. More specifically the scheduler determines Which UE(s) is (are) allowed to transmit, Which physical channel resources (frequency), Transport format (Modulation Coding Scheme (MCS)) to be used by the mobile terminal for transmission The allocation information is signaled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one subframe. Additional information may also be included in the grant message, depending on the selected scheme. Only "per UE" grants are used to grant the right to transmit on the UL-SCH (i.e. there are no "per UE per RB" grants). Therefore the UE needs to distribute the allocated resources among the radio bearers according to some rules. Unlike in HSUPA, there is no UE based transport format selection. The eNB decides the transport format based on some information, e.g. reported scheduling information and QoS information, and the UE has to follow the selected transport format. In HSUPA the Node B assigns the maximum uplink resource, and the UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided.

Clear QoS differentiation for radio bearers/services should be supported by the scheduling scheme.

The UL reporting should allow fine granular buffer reports (e.g. per radio bearer or per radio bearer group) in order to allow the eNB scheduler to identify for which Radio Bearer/service data is to be sent.

It should be possible to make clear QoS differentiation between services of different users.

It should be possible to provide a minimum bit rate per radio bearer.

As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Uplink Power Control

Uplink transmission power control in a mobile communication system serves an important purpose: it balances the need for sufficient transmitted energy per bit to achieve the required Quality of Service (QoS) against the need to minimize interference to other users of the system and to maximize the battery life of the mobile terminal. In achieving this purpose, the role of the Power Control (PC) becomes decisive to provide the required SINR while controlling at the same time the interference caused to neighboring cells. The idea of classic PC schemes in uplink is that all users are received with the same SINR, which is known as full compensation. As an alternative, the 3GPP has adopted for LTE the use of Fractional Power Control (FPC). This new functionality makes users with a higher pathloss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (for further details on the power control formulae, see for example 3GPP TS 36.213, "Evolved Universal Terrestrial Radio Access (E-UTRA); Physical layer procedures (Release 8)", version 8.8.0 or 9.1.0, section 5.1, available at http://www.3gpp.org and incorporated herein by reference). The formula for each of these uplink signals follows the same basic principles; in all cases they can be considered as a summation of two main terms: a basic open-loop operating point derived from static or semi-static parameters signaled by the eNodeB, and a dynamic offset updated from subframe to subframe.

The basic open-loop operating point for the transmit power per resource block depends on a number of factors including the inter-cell interference and cell load. It can be further broken down into two components, a semi-static base level $P_0$, further made up of a common power level for all user equipments in the cell (measured in dBm) and a UE-specific offset, and an open-loop pathloss compensation component. The dynamic offset part of the power per resource block can also be further broken down into two components, a component dependent on the MCS and explicit Transmitter Power Control (TPC) commands.

The MCS-dependent component (referred to in the LTE specifications as $\Delta_{TF}$, where TF stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling, i.e. the mode cannot be changed dynamically. With the accumulative TPC commands, each TPC command signals a power step relative to the previous level.

Power Headroom Reporting

In order to assist the eNodeB to schedule the uplink transmission resources to different user equipments in an appropriate way, it is important that the user equipment can report its available power headroom to eNodeB.

The eNodeB can use the power headroom reports to determine how much more uplink bandwidth per subframe a user equipment is capable of using. This helps to avoid allocating uplink transmission resources to user equipments which are unable to use them in order to avoid a waste of resources.

The range of the power headroom report is from +40 to −23 dB (see 3GPP TS 36.133, "Requirements for support of radio resource management", version 8.7.0, section 9.1.8.4, available at http://www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in subframes in which a UE has an UL transmission grant. The report relates to the subframe in which it is sent. The power headroom report is therefore a prediction rather than a direct measurement; the UE cannot directly measure its actual transmission power headroom for the subframe in which the report is to be transmitted. It therefore relies on reasonably accurate calibration of the UE's power amplifier output.

A number of criteria are defined to trigger a power headroom report. These include:

A significant change in estimated pathloss since the last power headroom report

More than a configured time has elapsed since the previous power headroom report More than a configured number of closed-loop TPC commands have been implemented by the UE The eNodeB can configure parameters to control each of these triggers depending on the system loading and the requirements of its scheduling algorithm. To be more specific, RRC controls power headroom reporting by configuring the two timers "periodicPHR-Timer" and "prohibitPHR-Timer", and by signalling "dl-PathlossChange" which sets the change in measured downlink pathloss to trigger a power headroom report.

The power headroom report is send as a MAC Control Element. It consists of a single octet where the two highest bits are reserved and the six lowest bits represent the 64 dB values mentioned above in 1 dB steps. The structure of the MAC Control Element for the Rel-8 power headroom report is shown in FIG. 7.

The UE power headroom PH [dB] valid for subframe i is defined by the following equation (see section 5.1.1.2 of 3GPP TS 36.213 incorporated herein by reference):

$$PH(i) = P_{CMAX} - \{10 \cdot \log_{10}(M_{PUSCH}(i)) + P_{0\_PUSCH}(j) + \alpha(j) \cdot PL + \Delta_{TF}(i) + f(i)\}$$

The power headroom is rounded to the closest value in the range [40; −23] dB with steps of 1 dB. $P_{CMAX}$ is the total maximum UE transmit power (or total maximum transmit power of the user equipment) and is a value chosen by the user equipment in the given range of $P_{CMAX\_L}$ and $P_{CMAX\_H}$ based on the following constraints:

$$P_{CMAX\_L} \le P_{CMAX} \le P_{CMAX\_H}$$

$$P_{CMAX\_L} = \min(P_{EMAX} - \Delta T_C, P_{PowerClass} - MPR - AMPR - \Delta T_C)$$

$$P_{CMAX\_H} = \min(P_{EMAX}, P_{PowerClass})$$

$P_{EMAX}$ is the value signaled by the network, and $\Delta T_C$, MPR and A-MPR (also denoted as A-MPR-Additional Maximum Power Reduction) are specified in 3GPP TS 36.101, "Evolved Universal Terrestrial Radio Access (E-UTRA); User Equipment (UE) radio transmission and reception", version 8.7.0, section 6.2 available at http// www.3gpp.org and incorporated herein by reference.

MPR is a power reduction value, the so-called Maximum Power Reduction, used to control the Adjacent Channel Leakage Power Ratio (ACLR) associated with the various modulation schemes and the transmission bandwidth.

A-MPR is the additional maximum power reduction. It is band specific and it is applied when configured by the network. Therefore, $P_{cmax}$ is UE implementation specific and hence not known by eNB.

Uplink Power Control for Carrier Aggregation

One main point of UL Power control for LTE-Advanced is that a component carrier specific UL power control is supported, i.e. there will be one independent power control loop for each UL component carrier configured for the UE. Furthermore power headroom is reported per component carrier.

In Rel-10 within the scope of carrier aggregation there are two maximum power limits, a maximum total UE transmit power and a CC-specific maximum transmit power. RAN1 agreed at the RAN1#60bis meeting that a power headroom report, which is reported per CC, accounts for the maximum power reduction (MPR). In other words, the power reduction applied by the UE is taken into account in the CC-specific maximum transmission power $P_{CMAX,c}$ (c denotes the component carrier).

As already mentioned before the purpose of values MPR/ A-MPR is to allow the mobile device to lower its maximum transmission power in order to be able to meet the requirements on signal quality, spectrum emission mask and spurious emissions.

In addition to MPR and A-MPR in Release 10 the so called power management MPR, also referred to as P-MPR, was introduced in order to account for multi-RAT terminals which may have to limit their LTE total output power, particularly when simultaneous transmission on another RAT is taking place. Such power restrictions may arise, for example from regulations on Specific Absorption Rate (SAR) of radio energy into a user's body or from out-of-band emission requirements that may be affected by the inter-modulation products of the simultaneous radio transmissions. The P-MPR is not aggregated with MPR/A-MPR, since any reduction in a UE's maximum output power for the latter factor helps to satisfy the requirements that would have necessitated P-MPR.

Considering now the additional power management MPR (P-MPR), the UE configures its nominal maximum transmission power $P_{CMAX}$, i.e. the maximum transmission power available for the UE, according to the following equations:

$$P_{CMAX\_L} \le P_{CMAX} \le P_{CMAX\_H}$$

$$P_{CMAX\_L} = \min\{P_{EMAX} - \Delta T_C, P_{PowerClass} - \max(MPR + A-MPR, P-MPR) - \Delta T_C\}$$

$$P_{CMAX\_H} = \min\{P_{EMAX}, P_{PowerClass}\}$$

For the case of carrier aggregation, the $P_{CMAX}$ becomes $P_{CMAX,c}$, the component-carrier specific maximum transmission power. Essentially the configured maximum output power on serving cell c shall be set within the following bounds:

$$P_{CMAX\_L,c} \le P_{CMAX,c} \le P_{CMAX\_H,c}$$

Two different deployments are to be considered, one where aggregated carriers are within the same frequency band, and also the case where carriers of different frequency bands are aggregated.

For intra-band contiguous carrier aggregation:

$$P_{CMAX\_L,c} = MIN\{P_{EMAX,c} - \Delta T_{C,c}, P_{PowerClass} - MAX(MPR_c + A-MPR_c + \Delta T_{IB,c}, P-MPR_c) - \Delta T_{C,c}\}$$

For inter-band carrier aggregation:

$$P_{CMAX\_L,c} = MIN\{P_{EMAX,c} - \Delta T_{C,c}, P_{PowerClass} - MAX(MPR_c + A-MPR_c + \Delta T_{IB,c}, P-MPR_c) - \Delta T_{C,c}\}$$

$$P_{CMAX\_H,c} = MIN\{P_{EMAX,c}, P_{PowerClass}\}$$

$P_{EMAX,c}$ is the value given by IE P-Max for serving cell c in TS36.331

For inter-band carrier aggregation, $MPR_c$ and $A-MPR_c$ apply per serving cell c, i.e. there is a separate MPR and A-MPR per serving cell. For intra-band contiguous carrier aggregation, $MPR_c = MPR$, and $A-MPR_c = A-MPR$. $P-MPR_c$ accounts for power management for serving cell c. For intra-band contiguous carrier aggregation, there is one power management term for the UE, P-MPR, and $P-MPR_c = P-MPR$.

For carrier aggregation with two UL serving cells, the total configured maximum output power $P_{CMAX}$ shall be set within the following bounds:

$$P_{CMAX\_L,CA} \le P_{CMAX} \le P_{CMAX\_H,CA}$$

For intra-band contiguous carrier aggregation, $$P_{CMAX\_L\_CA} = MIN\{10 \log_{10} \Sigma P_{EMAX,c} - \Delta T_C, P_{PowerClass} - MAX(MPR + A-MPR + \Delta T_{IB,c}, P-MPR) - \Delta T_C\}$$

$$P_{CMAX\_H\_CA} = MIN\{10 \log_{10} \Sigma p_{EMAX,c}, P_{PowerClass}\}$$

where $P_{EMAX,c}$ is the linear value of $P_{EMAX,c}$ which is given by RRC signaling (for details see TS 36.331 incorporated herein by reference).

For inter-band carrier aggregation with up to one serving cell c per operating band:

$$P_{CMAX\_L\_CA} = MIN\{10 \log_{10} \Sigma MIN[p_{EMAX,c}/(\Delta t_{C,c}), p_{PowerClass}/(mpr_c \cdot a\text{-}mpr_c \cdot \Delta t_{C,c} \cdot \Delta t_{IB,c}), p_{PowerClass}/(pmpr_c \cdot \Delta t_{C,c})], P_{PowerClass}\}$$

$$P_{CMAX\_H\_CA} = MIN\{10 \log_{10} \Sigma p_{EMAX,c}, P_{PowerClass}\}$$

where $p_{EMAX,c}$ is the linear value of $P_{EMAX,c}$ which is given by TS 36.331. $MPR_c$ and $A-MPR_c$ apply per serving cell c and are specified in subclause 6.2.3 and subclause 6.2.4 of TS36.101, respectively, also incorporated herein by reference. $mpr_c$ is the linear value of $MPR_c$. $a\text{-}mpr_c$ is the linear value of $A-MPR_c$. $P-MPR_c$ accounts for power management for serving cell c. $pmpr_c$ is the linear value of $P-MPR_c$.

Further information about the definition of cc-specific maximum transmission power respectively the UE total maximum transmission power can be found in TS36.101, incorporated herein by reference.

Different to Rel-8/9 for LTE-A the UE has also to cope with simultaneous PUSCH-PUCCH transmission, multi-cluster scheduling, and simultaneous transmission on multiple CCs, which requires larger MPR values and also causes a larger variation of the applied MPR values compared to Rel-8/9.

It should be noted that the eNB does not have knowledge of the power reduction applied by the UE on each CC, since the actual power reduction depends on the type of allocation, the standardized MPR value and also on the UE implementation. Therefore, the eNB does not know the CC-specific maximum transmission power relative to which the UE calculates the PHR. In Rel-8/9 for example UE's maximum transmit power $P_{CMAX}$ can be within some certain range as described above.

$$P_{CMAX\_L} \leq P_{CMAX} \leq P_{CMAX\_H}$$

Due to the fact that the power reduction applied by the UE to the maximum transmit power of a CC is not known by eNB it was agreed to introduce in Rel-10 a new power headroom MAC control element, which is also referred to as extended power headroom MAC control element. The main difference to the Rel-8/9 PHR MAC CE format, is that it includes a Rel-8/9 power headroom value for each activated UL CC and is hence of variable size. Furthermore it not only reports the power headroom value for a CC but also the corresponding $P_{CMAX,c}$ (maximum transmit power of CC with the index c) value. In order to account for simultaneous PUSCH-PUCCH transmissions, the UE reports for PCell the Rel-8/9 power headroom value which is related to PUSCH-only transmissions (referred to type 1 power headroom), and if the UE is configured for simultaneous PUSCH-PUCCH transmission, a further Power headroom value, which considers PUCCH and PUSCH transmissions, also referred to as type 2 power headroom.

In order to be able to distinguish at the eNB side whether the maximum transmission power was reduced due to MPR/A-MPR power reduction or caused by applying a P-MPR, a one bit indicator, also referred to as P-bit, was introduced in the extended power headroom MAC CE. More in particular the UE sets P=1 if the corresponding maximum transmission power ($P_{CMAX,c}$) would have had a different value if no power backoff due to power management (P-MPR) had been applied. Essentially this P bit is used by the eNB to remove the PHR reports, which are affected by P-MPR, from the MPR-learning algorithm in the eNB, i.e. eNB stores in an internal table which MPR value the UE uses for certain resource allocations.

For further details on the extended power headroom MAC Control element illustrated in FIG. 8, see for example 3GPP TS 36.321, "Evolved Universal Terrestrial Radio Access (E-UTRA); Medium Access Control (MAC) protocol specification (Release 10)", version 10.0.0, section 6.1.3.6a, available at http://www.3gpp.org and incorporated herein by reference.

Type-1 power headroom can also be reported for subframes where there is no actual PUSCH transmission. This special PHR is also referred to as virtual PHR. In such cases, 10 $\log_{10}(M_{PUSCH}(i))$ and $\Delta_{TF,c}(i)$ in the expression of the power headroom report shown above are set to zero. Values for the pathloss (PL), received TPC commands f(i) and other CC specific constants (PO_PUSCH(j), α) are available for the serving cell or respectively CC, even without UL data transmission:

$$PH_{virtual,c}(i) = P_{CMAX,H,C} - \{P_{0\_PUSCH}(j) + \alpha(j)*PL_c + f(i)\}$$

This can be seen as the power headroom assuming a default transmission configuration corresponding to the minimum possible resource assignment (M=1) and the modulation-and-coding scheme associated with $\Delta_{TF,c}(i)=0$ dB.

The carrier-specific maximum transmission power $$\tilde{P}_{CMAX,c}(i)$$

is computed assuming MPR=0 dB, A-MPR=0 dB, P-MPR=0 dB and $\Delta T_c=0$ dB.

Essentially $$\tilde{P}_{CMAX,c}(i)$$

is equal to $P_{CMAX\_H,c} = \text{MIN}\{P_{EMAX,c}, P_{PowerClass}\}$.

Similar to Type-1 power headroom reporting, the Type-2 power headroom can also be reported for subframes in which no PUSCH and/or PUCCH is transmitted. In that case a virtual PUSCH and/or PUCCH transmit power is calculated, assuming the smallest possible resource assignment (M=1) and $\Delta$MCS=0 dB for PUSCH and h($n_{CQI}$, $n_{HARQ}$, $n_{SR}$), $\Delta_{F\_PUCCH}(F)$, $\Delta_{TxD}(F')$ set to 0 for PUCCH. Further details about the computation of power headroom can be found in the corresponding subclause 5.1.1.2 "Power Headroom Reporting" of TS 36.213, incorporated herein by reference.

TTI Bundling

In order to increase the uplink coverage for power limited terminals or coverage scenarios, so-called TTI bundling has been introduced into Release 8 of LTE. The power-limited terminals may be, for instance, the UEs present in the cell edge. A power-limited coverage scenario occurs, for instance, at the cell edge, where the signal received from the network (base station, eNB) is rather weak and the terminal has to increase its power and/or set a more robust modulation and coding scheme in order to enable the base station to receive its signal in the uplink. However, the possibility of increasing the transmission power is limited since it causes interference for other devices in this cell and possibly in the neighboring cells as well. Thus, the power limitation is mainly due to the limited interference to be generated. A further advantage of TTI bundling is also the reduction of overhead to avoid RLC segmentation.

FIG. 9 illustrates TTI bundling mechanisms. The data to be transmitted is first coded 901. After the coding, the data is mapped onto four consecutive subframes 905, which are referred to as four bundled subframes or simply as a TTI bundle with a length of four subframes. For instance, in a power-limited scenario a single transport block from the MAC layer may be transmitted repeatedly in the four consecutive bundled subframes in order to increase the robustness of the transmission. The numbers indicated in the subframe-representing squares indicate the number of the HARQ process. The four subframes of the bundle belonging to the first process are denoted by 0000, the four subframes of the bundle belonging to the second process are denoted 1111, etc. Thus, in FIG. 9, four HARQ processes 0 to 3 are configured. For instance, the configuration of the number of processes in LTE is always 8 in the uplink per serving cell if no TTI-bundling is applied. If TTI-bundling is applied, there are 4 HARQ processes.

During the TTI bundling, the efficiency of signaling is increased by providing only one set of control signaling for the transmission of the entire bundle. For instance, the terminal will only receive PDCCH uplink grants once per entire bundle. Moreover, within a bundle, HARQ retransmissions are non-adaptive and triggered without waiting for HARQ feedback from previous transmissions. This is illustrated in FIG. 9, in which within the bundle data transmitted in the first four subframes 905 an error is detected. Accordingly, a negative acknowledgement (NACK) is transmitted from the network to the terminal. After receiving the negative acknowledgement, the terminal retransmits the data of all four subframes 905 in a new bundle of TTIs within subframes 915.

In general, dynamic scheduling of TTI, bundling may be supported, which means that a TTI bundle may be scheduled at any time by using the signaling channel PDCCH. For instance, the starting point for transmitting the TTI bundle may be defined by such signaling. In particular, the PDCCH includes an uplink grant for the bundle into a PDCCH which is transmitted in a certain subframe. A fixed pattern is defined or configured by higher layers, which specifies the number of subframes between the certain grant (i.e. the reception of the grant by the terminal) and the transmission of the bundle for which the grant was received. Such a fixed timing pattern enables reducing the signaling overhead since the grant does not need to explicitly specify the number of subframe in which the bundle is to be transmitted. Rather, the position of the grant in the time domain (in terms of subframe number) and the defined gap between the reception of grant and the transmission of data, enable to unambiguously determine the time point for the bundle transmission. Accordingly, for instance, the terminal always transmits a bundle of N subframes after M subframes from receiving the grant for the bundle. The parameter M is set according to the system parameters such as round-trip time and processing delay. According to 3GPP TS 36.213, v. 8.8.0 "Physical layer procedures", September 2009, in particular Section 8 (available freely at www.3gpp.org and incorporated herein by reference), for FDD (Frequency Division Duplex) mode and subframe (TTI) bundling operation, the UE will upon detection of a PDCCH with DCI format 0 in subframe n intended for the UE, and/or a PHICH transmission in subframe n−5 intended for the UE, adjust the corresponding first PUSCH transmission in the bundle in subframe n+4 according to the PDCCH and PHICH information. Thus, the timing in the Rel-8 LTE is fixed, i.e. for TTI Bundling operation, the data is transmitted from the terminal to the network 4 subframes after receiving a grant and 9 subframes after negative acknowledgement (in PHICH).

Apart from a possible fixed pattern (timing) between the reception of a grant and the transmission of the bundle data, the timing pattern may also be specified for the events of the retransmission protocol. For instance, the transmission of acknowledgement (positive or negative) may also be timed fixedly with respect to receiving of the grant and/or transmitting the data. Similarly, the data retransmission may be timed fixedly with respect to receiving of the feedback (acknowledgement) and/or the data transmission and/or the grant reception. In the LTE as currently defined, the fixed grant and HARQ process timing are specified for the downlink and uplink shared channel.

MTC Devices

3GPP has started an activity on Machine Type Communication (MTC) with specific service requirements. The MTC terminals or MTC devices are characterized that they are usually not operated by human beings and the communication peer is another machine, e.g. so called MTC server or another MTC terminal(s). The MTC has some specifics that are different from the usual human-to-human communication. They typically have quite modest requirements in terms of data rate and delay which could be also served well by GSM/GPRS; but as more MTC-devices are deployed, the reliance on GSM/GPRS increases, which increases maintenance costs of operating several Radio Access Technologies (RATs). With users and traffic becoming denser, using more spectral efficient technologies, such as Long Term Evolution (LTE), allows the operators to utilize their spectrum in a much more efficient way.

Some MTC UEs are installed in the basements of residential buildings or locations shielded by foil-backed insulation, metalized windows or traditional thick-walled building construction, and these UEs would experience significantly greater penetration losses on the radio interface than normal LTE devices. The MTC UEs in the extreme coverage scenario might have characteristics such as very low data rate, greater delay tolerance, and no mobility, and therefore some messages/channels may not be required.

One of the objectives of the Rel-12 work item on "Low cost & enhanced coverage MTC UE for LTE" is to specify coverage improvements for those MTC devices in permanent poor radio conditions. For such devices, e.g. utility meters in basements, a large increase in SNR is needed for sufficient coverage. The high costs from solutions such as deploying additional base stations or relay nodes are difficult to justify. Therefore, other techniques such as repetition and power boosting are investigated and then standardized within the Rel-12 WI.

Repetition/TTI Bundling

More energy can be accumulated to improve coverage by prolonging transmission time. The existing TTI bundling (standardized in Rel-8 for uplink coverage improvements) and HARQ retransmission in data channel can be helpful. Note that since the current maximum number of UL HARQ retransmission is 28 and TTI bundling is up to 4 consecutive subframes, TTI bundling with larger TTI bundle size is considered within the WI on "Low cost & enhanced coverage MTC UE for LTE" and the maximum number of HARQ retransmissions may be extended to achieve better performance.

One of the objectives of the Rel-12 work item on "Low cost & enhanced coverage MTC UE for LTE" is to specify coverage improvements corresponding to 15 dB. The reference link budget is for a data rate of 20 kbps in both downlink and uplink. Compared to this reference, the operating point needs to be lowered about 15.0 dB in uplink and not far from that also in downlink (14.3 dB for a low-complexity UE, 10.3 dB for a normal UE). According to simulations performed in study item, with practical channel estimation etc. the required number of repetitions may be significant, especially in uplink, e.g. 64.

Power Boosting/PSD Boosting

More power can be used by the eNB on the DL transmission to a MTC UE (i.e., power boosting) in order to increase the coverage. In the case of uplink, most terminals with bad radio conditions are already using full power though. Another approach is to concentrate a given level of power into a reduced bandwidth at the eNB or the UE (i.e., PSD boosting). The application of power boosting or PSD boosting will depend on the channel or signal under consideration.

Shortcomings of Related Art Power Control

As explained above, user equipments in permanent poor radio conditions will be configured to operate in the enhanced coverage mode. It thus can be assumed that MTC UEs will be more or less always transmitting at their maximum transmit power (otherwise they would not be in the enhanced overage mode). The inventors of the present disclosure have identified that in these particular cases, the power headroom for the MTC UEs will be most of the times zero or negative; thus, indicating the power-limitation. The benefit of such a power headroom reporting for MTC UEs in enhanced coverage is very limited.

SUMMARY

One non-limiting and exemplary embodiment provides an improved power headroom reporting mobile communication system with a user equipment in an enhanced coverage mode, avoiding the disadvantages of the related art as identified above. The exemplary embodiment(s) is solved by the subject matter of the independent claims. Advantageous embodiments are subject to the dependent claims.

In one general aspect, the techniques disclosed here feature a method for power headroom reporting in a communication system, in which a user equipment is communicating with a base station via a communication link, the method including: determining whether or not the user equipment is operating in an enhanced coverage mode; preparing a power headroom report, wherein in case the user equipment is determined to operate in the enhanced coverage mode, the power headroom report is prepared by including virtual power headroom information for the communication link; and transmitting the prepared power headroom report to the base station, the determining, the preparing, and the transmitting being performed by the user equipment upon being triggered to perform power headroom reporting.

The general aspect may be implemented using a system, a device, and a computer program, and any combination of systems, devices, and computer programs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 8 illustrates an extended Power Headroom Report, ePHR, MAC control element as defined in 3GPP LTE (Release 10);

FIG. 14 illustrates exemplarily different codepoints in the PH field of the PHR that could be associated with the different repetition levels in the downlink and/or uplink, according to the third and fourth embodiments;

FIG. 15 illustrates exemplarily different codepoints in the PH field of the PHR that could be associated with the different repetition levels in the downlink and/or uplink, according to the third and fourth embodiments;

FIG. 16 illustrates exemplarily different codepoints in the PH field of the PHR that could be associated with the different repetition levels in the downlink and/or uplink, according to the third and fourth embodiments;

FIG. 17 illustrates different MAC CE structures for transporting number of repetitions for uplink and/or downlink, according to the third and fourth embodiments;

FIG. 18 illustrates different MAC CE structures for transporting number of repetitions for uplink and/or downlink, according to the third and fourth embodiments; and FIG. 19 illustrates different MAC CE structures for transporting number of repetitions for uplink and/or downlink, according to the third and fourth embodiments.

DETAILED DESCRIPTION

Figure 1:
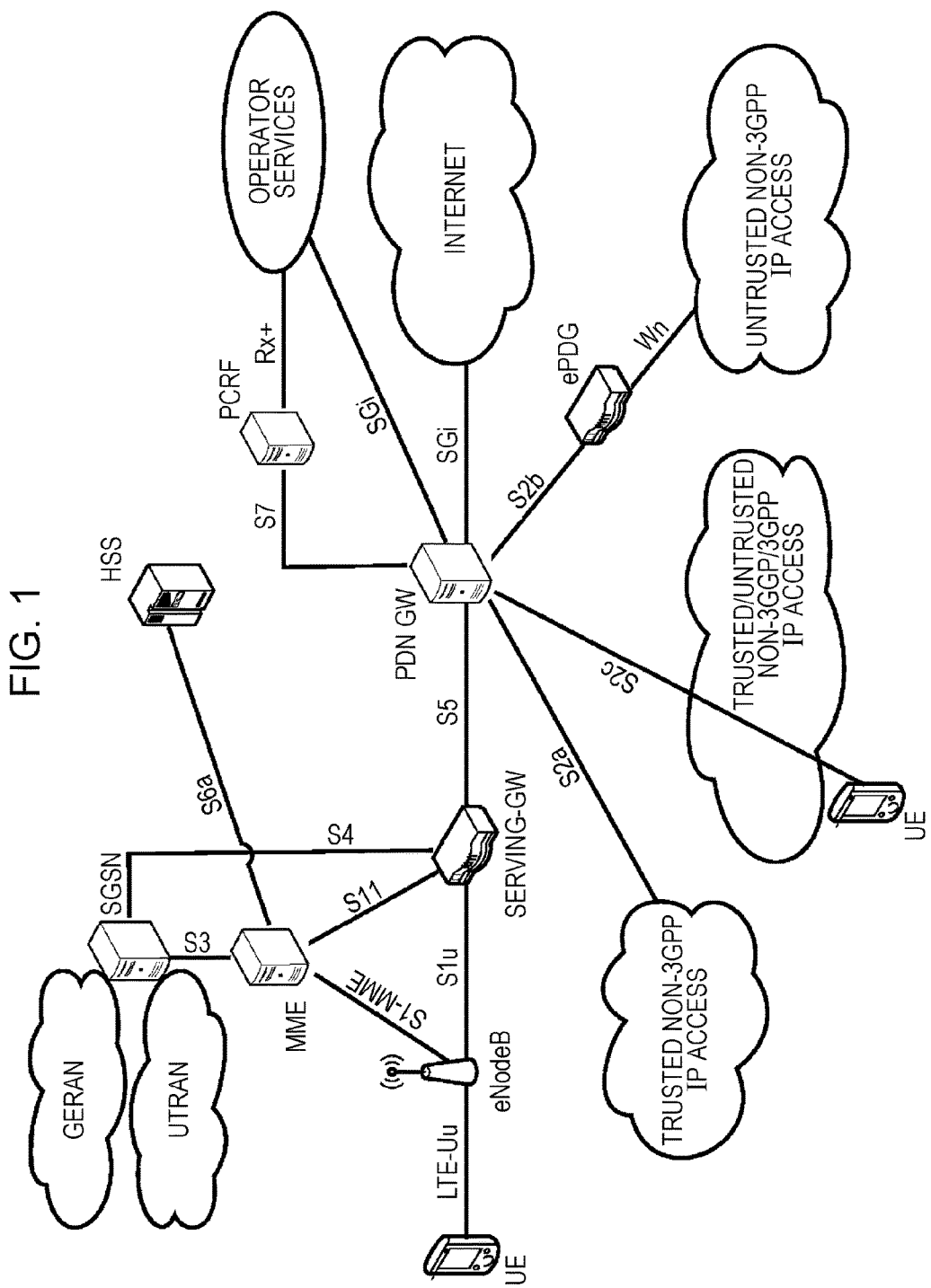
FIG. 1 shows an exemplary architecture of a 3GPP LTE system.
Figure 2:
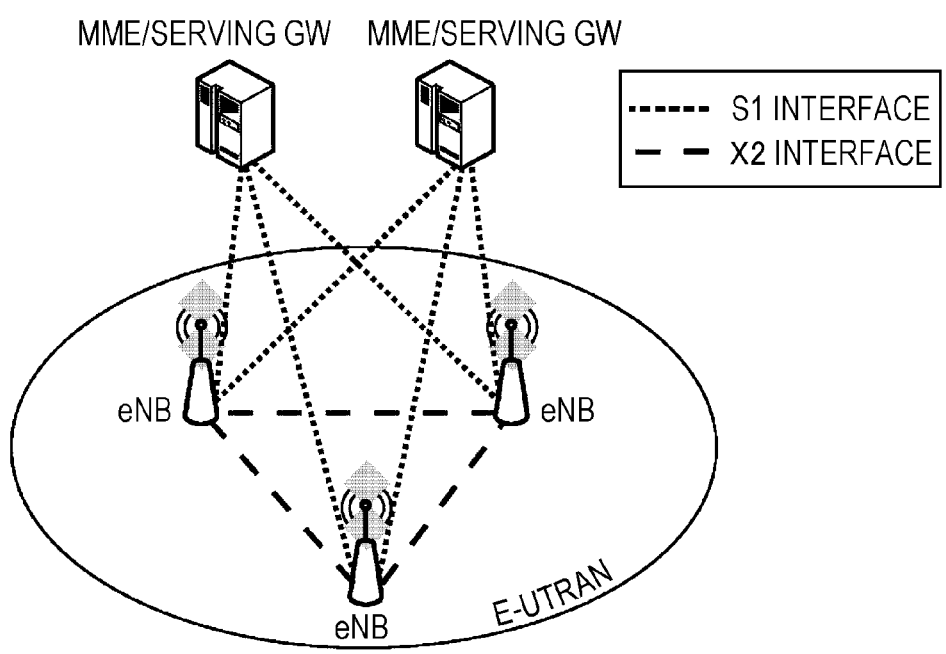
FIG. 2 shows an exemplary overview of the overall E-UTRAN architecture of 3GPP LTE.
Figure 3:
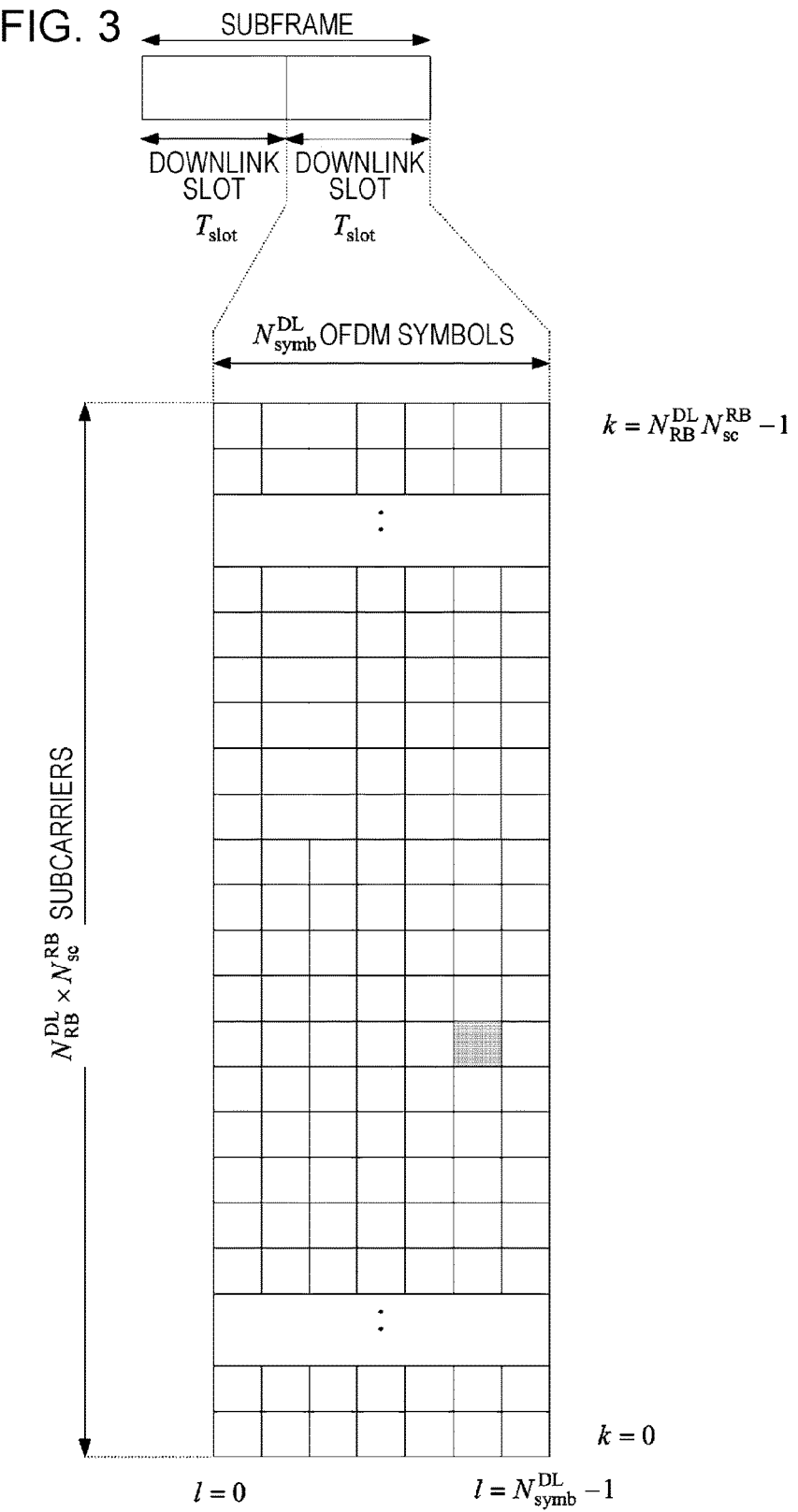
FIG. 3 shows exemplary subframe boundaries on a downlink component carrier as defined for 3GPP LTE (Release 8/9)
Figure 4:
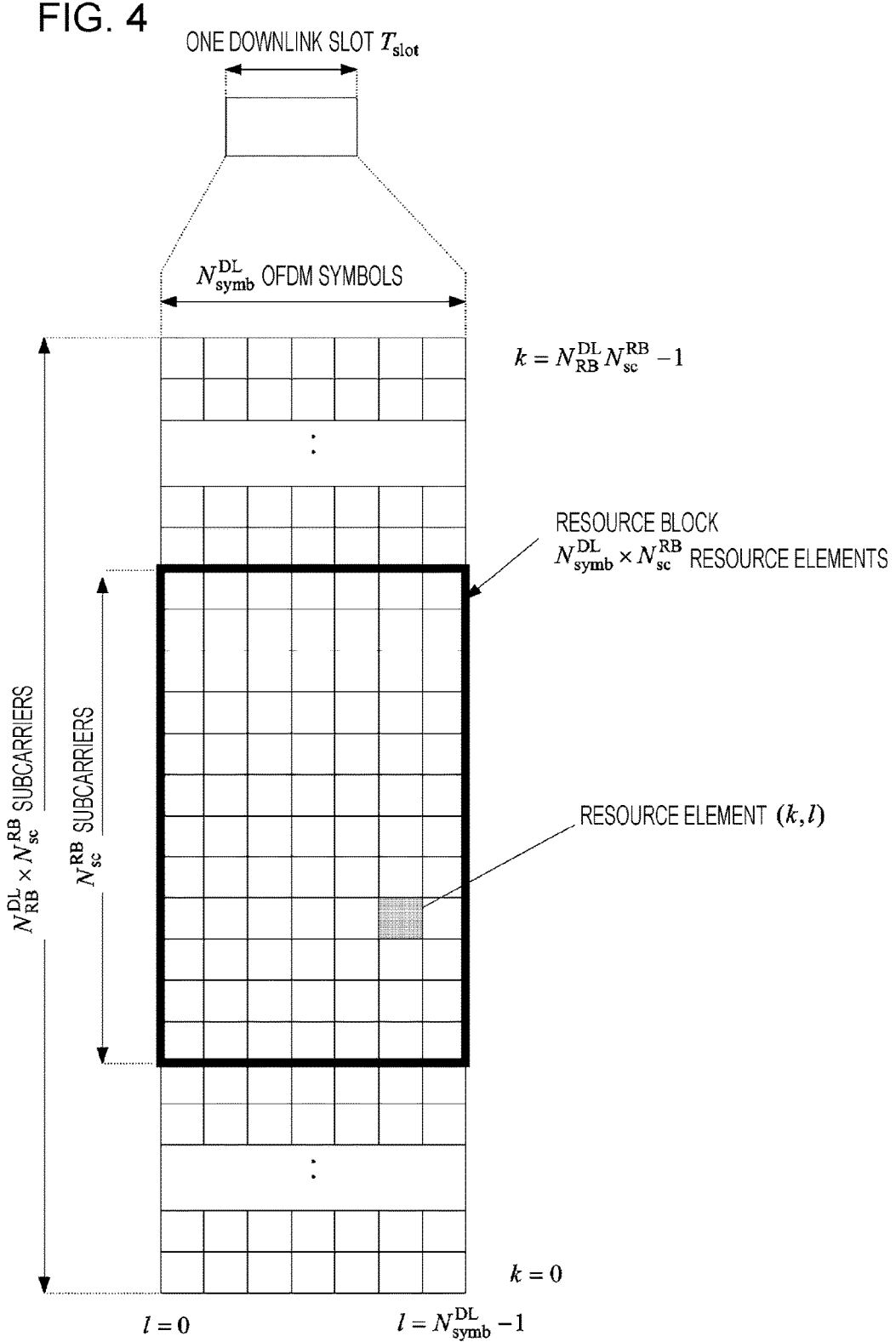
FIG. 4 shows an exemplary downlink resource grid of a downlink slot as defined for 3GPP LTE (Release 8/9)
Figure 5:
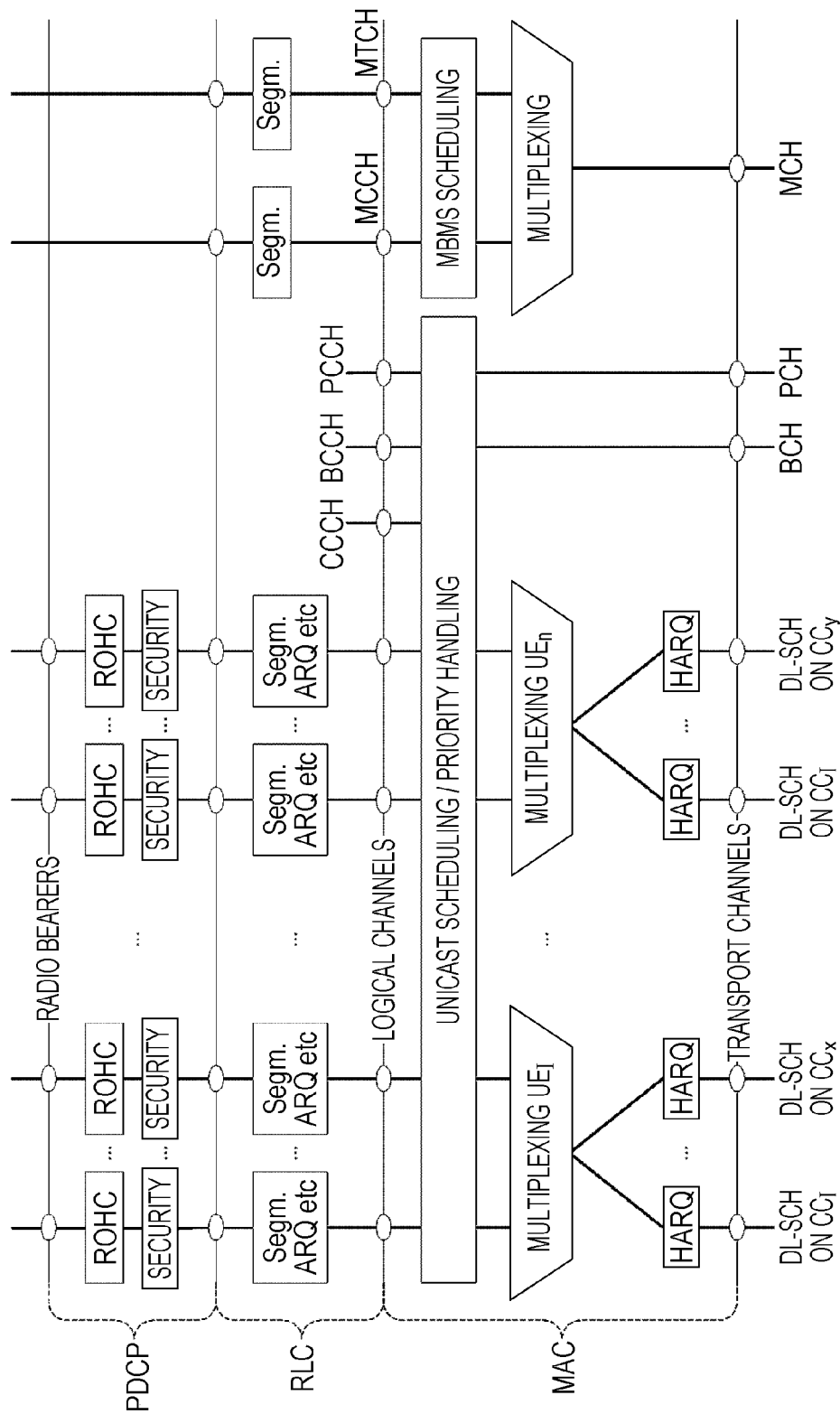
FIG. 5 shows the 3GPP LTE-A (Release 10) Layer 2 structure with activated carrier aggregation for the downlink and uplink, respectively.
Figure 6:
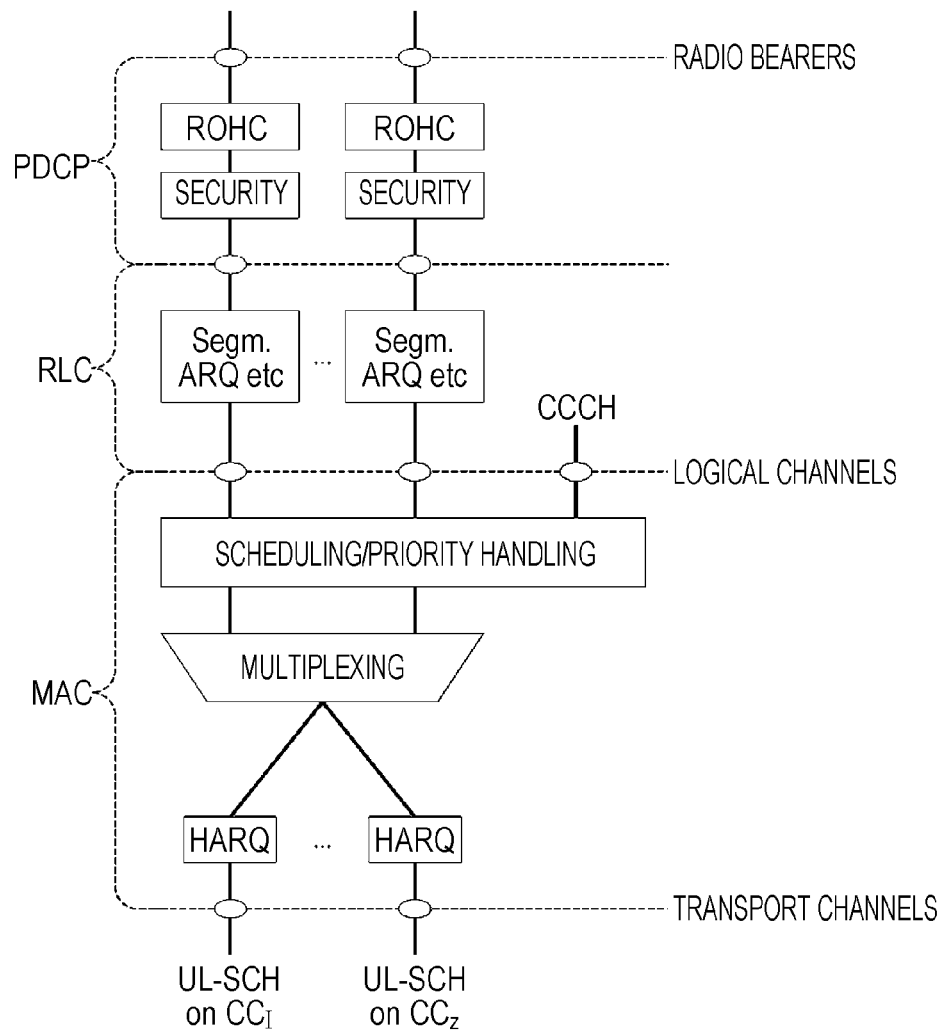
FIG. 6 shows the 3GPP LTE-A (Release 10) Layer 2 structure with activated carrier aggregation for the downlink and uplink, respectively.
Figure 7:
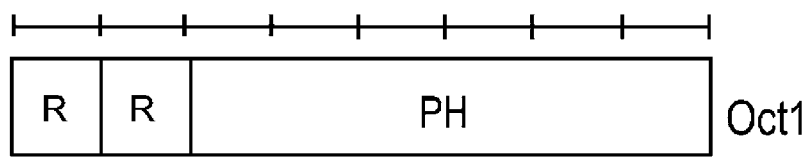
FIG. 7 shows a Power Headroom Report, PHR, MAC control element as defined in 3GPP LTE (Release 8/9)
Figure 9:
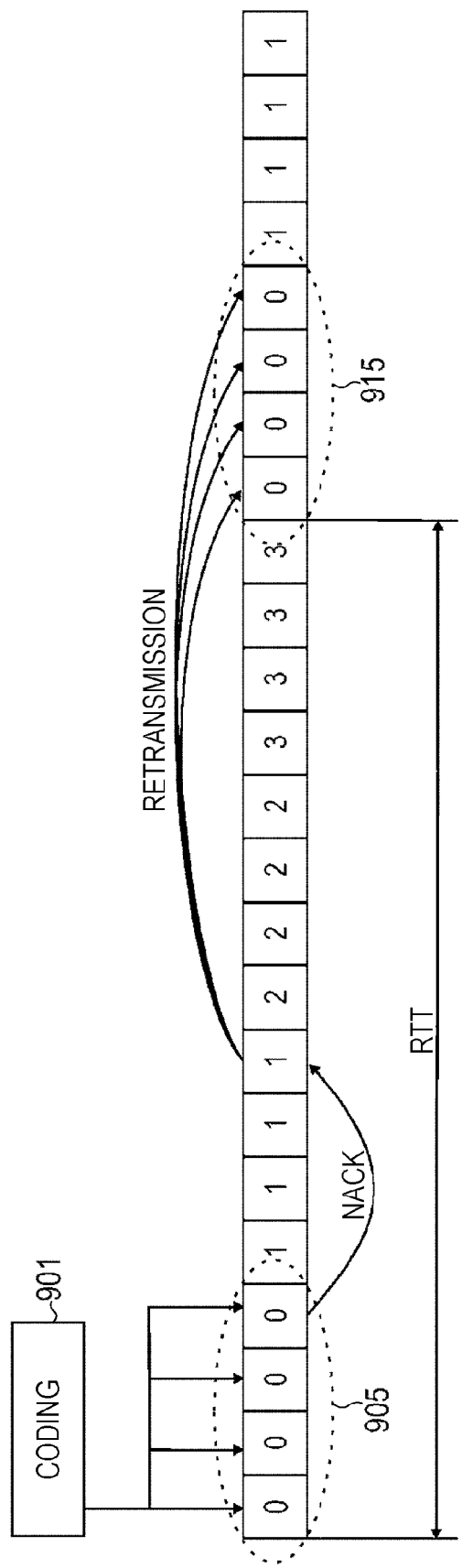
FIG. 9 is a schematic drawing illustrating TTI bundling in context of a multi-process ARQ protocol.

For explaining the present disclosure the following assumptions are taken. As introduced in the background section, a user equipment can be configured to use enhancements for enhanced coverage (i.e. operate in an enhanced coverage mode) in particular situations, such as when the UE (such as an MTC device) is under permanent poor radio conditions. According to the current work item in 3GPP, UEs in such situations could thus be configured to use transmission repetitions or power boosting in the uplink and downlink. As inherent in the situation where the UE has poor radio conditions, the UE will transmit most of the time with its maximum power, i.e. will be power-limited. The inventors have identified that for such a situation the usual power headroom reporting is of very limited use (in view of that the power headroom will be zero or negative most of the times). Consequently, the power headroom reporting is optimized to transport other information to the base station and thus get more important benefits as will be explained according to the following aspects.

According to a first aspect of the present disclosure, the power headroom reporting procedure in the user equipment is adapted to additionally check whether or not the user equipment is indeed operating in an enhanced coverage mode. Then, in case the user equipment operates in the enhanced coverage mode, a virtual power headroom report is prepared; i.e. the power headroom report includes virtual power headroom information, which is calculated based on a virtual scheduled uplink grant (as explained in the background section). On the other hand, in case the user equipment is determined to not be operating in the enhanced coverage mode, the usual power headroom information is calculated by the UE and included in the power headroom report; i.e. a power headroom calculated based on an existing scheduled uplink grant or a virtual power headroom when no scheduled uplink grant exists.

In other words, according to this first aspect of the present disclosure, a UE which is operating in the enhanced coverage mode is always reporting the virtual power headroom to the base station, independent from whether or not there actually exists a scheduled uplink grant or not. As explained in the background section in detail for the virtual power headroom, the virtual power headroom is computed using parameters that are available for the PUSCH even when no uplink grant is available, while at the same time setting other parameters to zero. Effectively, the virtual power headroom thus allows to infer the pathloss of the communication link, and thus provides information on the channel state to the base station, which is more useful than the power headroom information calculated based on the existing scheduling uplink grant (as explained above).

This is particularly true for the main scenario of the enhanced coverage mode, which is a scenario where MTC devices are stationary and where the channel information should not change rapidly. Advantageously, the pathloss information, gathered thereby from the virtual power headroom can thus be used in the base station, in addition or instead of the usual channel state information. Also, the UE could be configured to no longer transmit any channel state information (or at least to significantly reduce the reporting periodicity of periodic CSI reporting), when the pathloss information from the virtual power headroom suffices for the scheduling. This may be configured by the base station.

According to a second aspect of the present disclosure, the first aspect of the present disclosure is changed in that a virtual power headroom report is not always transmitted, but only when the UE is indeed in a power-limited situation where the "normal" power headroom report is of very limited use. Namely, although the UE is operating in the enhanced coverage mode, it might not be power-limited at all times, and when the UE is not limited the normal PHR is still useful.

In particular, the UE further determines whether or not the user equipment is in a power-limited situation, when being triggered for power headroom reporting. Thus, only when the UE indeed is in the enhanced coverage mode and at the same time the UE is indeed power limited, the UE always prepares a virtual power headroom report (even if an uplink transmission would be performed for the subframe) and transmits same to the base station. As with the first aspect, the pathloss information on the communication link is derivable for the base station from the virtual power headroom and can be used for scheduling purposes with regard to this communication link to the UE.

On the other hand, in case the UE is not power limited, the usual power headroom reporting procedure is performed, meaning that the normal power headroom report is prepared based on a scheduled uplink grant (when such a scheduled uplink grant exists, as in the standard power headroom reporting procedure) and the virtual power headroom report is prepared (when no such scheduled uplink grant exists, as in the standard power headroom reporting procedure).

Advantageously, a one-bit flag may be included into the power headroom report with the virtual power headroom information in order to indicate that the UE is power limited. This allows the base station to learn that the virtual power headroom report was calculated in view of being in a power-limited situation as explained above; and not because e.g. no valid uplink grant was received and no uplink transmission is/will be performed for the subframe of the PHR reporting. For instance, one of the reserved bits already available in the power headroom report can be used in the respect.

According to third and fourth aspects of the present disclosure, the power headroom report is not used to report the virtual power headroom information to the base station as in the first and second aspects. Instead, the UE estimates corresponding numbers of repetitions to be used by the UE for an uplink transmission and respectively by the base station for a downlink transmission, and encodes same into the power headroom report. In particular, it is assumed that a repetition enhancement technique is introduced for UEs operating in the enhanced coverage mode, to extend their coverage.

In a similar manner to TTI bundling, in the uplink and downlink a particular transmission is repeated several times, such as 10, 20, 50, 80 or other number; no decision on the available repetition levels is yet taken in this 3GPP work item. Most likely, the configuration of the repetition level for uplink and downlink will be performed by the base station, although the present disclosure is restricted thereto.

In order to assist the base station in determining the optimum number of repetitions for the uplink and downlink, the UE can estimate the corresponding number of repetitions for an uplink transmission (third aspect) and/or can determine the number of repetitions of a downlink transmission that are/were necessary for correctly decoding the downlink transmission (fourth aspect). This information can be then transmitted to the base station, preferably within the triggered power headroom report.

As explained in connection with the first and second aspects, in the particular situation where the UE is operating in the enhanced coverage mode (or where additionally is in a power-limited situation), the usual power headroom report is assumed to be of very limited use. Instead, the power headroom reporting can be adapted to transport different information, such as the repetition level(s) as mentioned above. The third and fourth aspects thus are as follows.

In one particular embodiment of the third aspect, the UE, when in the enhanced coverage mode, shall estimate the number of repetitions of an uplink transmission to be performed by the UE; this may be done based e.g. on one of pathloss of the communication link, ACK/NACK history for previous uplink transmissions, or interference measurements for the link. Furthermore, this estimation may be performed either in a periodic manner, or specifically only in case a power headroom report is triggered. Then, when being triggered to report the power headroom, the UE will determine whether or not it is in the enhanced coverage mode. In the affirmative case, the power headroom report is prepared such that the estimated number of repetitions for an uplink transmission is encoded into the content of the power headroom report as a particular (predefined) codepoint. Alternatively, in case the UE periodically estimates the number of repetitions of an uplink transmission, then an average value can be encoded into the power headroom report. The thus-prepared power headroom report is then transmitted to the base station.

In one particular embodiment of the fourth aspect, the UE, when in the enhanced coverage mode, shall determine the number of repetitions of a downlink transmission from the base station necessary for successful decoding. This determination may be done by merely monitoring downlink decoding; the UE can merely count how many downlink repetitions of the same downlink transmission were necessary to decode the downlink transmission successfully. The UE can make the determination periodically, in which case an average number of the downlink repetitions can be reported to the base station (instead of a single one). Then, when being triggered to report the power headroom, the UE will determine whether or not it is in the enhanced coverage mode. In the affirmative case, the power headroom report is prepared such that the number of repetitions for a downlink transmission is encoded into the content of the power headroom report as a particular (predefined) codepoint. The thus-prepared power headroom report is then transmitted to the base station.

Of course, the power headroom report can carry the number of repetitions for both the uplink and downlink; i.e. the third aspect and fourth can be combined to be performed in parallel.

Additionally, as with the second aspect, the UE may encode the repetition number(s) into the power headroom report only for the additional case where the UE is indeed determined to be in a power-limited situation; only in this power-limited case, the power headroom report is of limited use and shall the substituted to carry the number of repetition for the uplink and/or downlink, as explained above. In the other case, where the UE, although being in an enhanced coverage mode, is not in a power-limited situation, the normal power headroom reporting shall be performed; and optionally the number of repetitions for uplink and/or downlink can be transmitted to the base station within a separate MAC CE (see below).

In either of the third and fourth aspects, the base station receives the power headroom report from the UE, and, knowing that the UE is in the enhanced coverage mode, expects the power headroom to carry the number of repetitions and not the usual power headroom information; the base station can thus associate the codepoint of the power headroom correctly with a particular number of repetitions.

Moreover, a new power headroom reporting trigger can be introduced for UEs in the enhanced coverage mode, particularly for the case where the UE periodically determines the number of repetitions for uplink/downlink. For instance, if the UE notices that the number of repetition (or repetition level) changes significantly (e.g. from one repetition level to another), then, the UE can be triggered to perform the "special" power headroom reporting so as to inform the base station about the change of repetition(s). This may be applied to the third and fourth aspects.

Furthermore, instead of re-using the power headroom reporting for the purpose of carrying the number of repetitions for the uplink/downlink (i.e. third/fourth aspects), a dedicated MAC control element (CE) can be used. In other words, a MAC CE carries the estimated number of repetitions for an uplink transmission and/or the determined number of repetitions for a downlink transmission. In this particular case, where the number of repetitions are carried in a separate MAC CE, the third and fourth aspects can also be combined with the first aspect and with the second aspect, since then the power headroom report can also be prepared to always include the virtual power headroom information.

One embodiment of the present disclosure provides a method for power headroom reporting in a communication system, wherein a user equipment is communicating with a base station via a communication link. The method includes various steps performed by the user equipment upon being triggered to perform power headroom reporting. The UE determines whether or not the user equipment is operating in an enhanced coverage mode. The UE prepares a power headroom report, wherein in case the user equipment is determined to operate in the enhanced coverage mode, the power headroom report is prepared by including virtual power headroom information for the communication link. The UE then transmits the prepared power headroom report to the base station.

According to an advantageous variant of this embodiment of the present disclosure which can be used in addition or alternatively to the above, also as part of a second embodiment of the present disclosure, the UE further determines whether or not the user equipment is in a power-limited situation. The step of preparing the power headroom report to include the virtual power headroom information is performed in case the user equipment is determined to be in a power-limited situation. As an optional implementation, the step of preparing the power headroom report for the communication link in case the user equipment is determined to be in a power-limited situation, includes that the UE includes into the virtual power headroom report a power-limitation indication. The power-limitation indication is indicative for the base station that the user equipment is in a power-limited situation. Preferably, a reserved bit of the power headroom report is used as the power-limitation indication.

According to an advantageous variant of this embodiment of the present disclosure which can be used in addition or alternatively to the above, in case the user equipment is determined not to be in a power-limited situation, the user equipment prepares the power headroom report by including power headroom information calculated based on an uplink grant on the communication link.

According to an advantageous variant of this embodiment of the present disclosure which can be used in addition or alternatively to the above, the base station receives the power headroom report from the user equipment and determines pathloss information of the communication link based on the virtual power headroom information in the received power headroom report. The base station may then perform scheduling processing based on the determined pathloss information.

According to an advantageous variant of this embodiment of the present disclosure which can be used in addition or alternatively to the above, the user equipment is configured to not report channel state information in case the user equipment is operating in the enhanced coverage mode. Alternatively, the user equipment is configured to reduce the periodicity of the channel state information reporting, in case the user equipment is operating in the enhanced coverage mode.

According to an advantageous variant of this embodiment of the present disclosure which can be used in addition or alternatively to the above, the user equipment is configured to be in the enhanced coverage mode, in case the user equipment is in or near to a power-limited situation. As an optional implementation, the base station configures the user equipment to operate in the enhanced coverage mode by transmitting a configuration message to the user equipment, and the configuration message furthermore configures the user equipment to not report channel state information or to reduce the periodicity of the channel state information reporting.

According to an advantageous variant of this embodiment of the present disclosure which can be used in addition or alternatively to the above, the user equipment is configured for extended power headroom reporting, and the power headroom report is an extended power headroom report.

According to an advantageous variant of this embodiment of the present disclosure which can be used in addition or alternatively to the above, the user equipment is a machine-type-communication, MTC, device.

According to an advantageous variant of this embodiment of the present disclosure which can be used in addition or alternatively to the above, the UE estimates a number of repetitions to be performed by the user equipment for an uplink transmission via the communication link to the base station, when the user equipment is operating in the enhanced coverage mode. In case the user equipment is determined to operate in the enhanced coverage mode, the user equipment transmits a Media Access Control, MAC, control element to the base station including the estimated number of repetitions for an uplink transmission.

According to an advantageous variant of this embodiment of the present disclosure which can be used in addition or alternatively to the above, the UE determines a number of repetitions of a downlink transmission via the communication link from the base station, necessary for the user equipment to successfully decode the downlink transmission, when the user equipment is operating in the enhanced coverage mode. In case the user equipment is determined to operate in the enhanced coverage mode, the user equipment transmits a Media Access Control, MAC, control element to the base station including the determined number of repetitions for successfully decoding a downlink transmission.

A further third embodiment of the present disclosure provides a method for power headroom reporting in a communication system, wherein a user equipment is communicating with a base station via a communication link. The UE estimates a number of repetitions to be performed by the user equipment for an uplink transmission via the communication link to the base station, when the user equipment is operating in an enhanced coverage mode. Upon being triggered to perform power headroom reporting, the user equipment performs the following steps. The UE prepares a power headroom report, and determines whether or not the user equipment is operating in the enhanced coverage mode. In case the user equipment is determined to operate in the enhanced coverage mode, the power headroom report is prepared by encoding the estimated number of repetitions for an uplink transmission as a codepoint into the power headroom report content. The UE transmits the power headroom report, including the codepoint encoding the estimated number of repetitions for an uplink transmission, to the base station.

According to an advantageous variant of this third embodiment of the present disclosure which can be used in addition or alternatively to the above, the user equipment estimates the number of repetitions for an uplink transmission, based on at least one of pathloss of the communication link, ACK/NACK information for previous uplink transmissions to the base station, or interference measurements for the communication link.

According to an advantageous variant of this third embodiment of the present disclosure which can be used in addition or alternatively to the above, the number of repetitions for an uplink transmission is one of a plurality of different repetition levels, predefined for being performed by the user equipment for an uplink transmission when the user equipment is operating in the enhanced coverage mode.

According to an advantageous variant of this third embodiment of the present disclosure which can be used in addition or alternatively to the above, the user equipment is triggered to perform power headroom reporting, in case the user equipment is operating in the enhanced coverage mode and the estimated number of repetitions for an uplink transmission to be performed by the user equipment changes significantly.

According to an advantageous variant of this third embodiment of the present disclosure which can be used in addition or alternatively to the above, the base station receives the power headroom report from the user equipment and determines the estimated number of repetitions for an uplink transmission, estimated by the user equipment, from the content of the received power headroom report and based on the fact that the user equipment is operating in the enhanced coverage mode. The base station determines the number of repetitions to be performed by the user equipment for an uplink transmission via the communication link, at least based on the estimated number of repetitions for an uplink transmission estimated by the user equipment, and transmits a repetition configuration message to the user equipment, the repetition configuration message configuring the user equipment to perform the determined number of repetitions for an uplink transmission via the communication link to the base station.

According to an advantageous variant of this third embodiment of the present disclosure which can be used in addition or alternatively to the above, the user equipment is configured for extended power headroom reporting, and the power headroom report, prepared by the user equipment and transmitted to the base station, is an extended power headroom report.

According to an advantageous variant of this third embodiment of the present disclosure which can be used in addition or alternatively to the above, the user equipment is a machine-type-communication, MTC, device.

According to an advantageous variant of this third embodiment of the present disclosure which can be used in addition or alternatively to the above, the UE determines a number of repetitions of a downlink transmission via the communication link from the base station, necessary for the user equipment to successfully decode the downlink transmission, when the user equipment is operating in the enhanced coverage mode. In case the user equipment is determined to operate in the enhanced coverage mode, the power headroom report is prepared by encoding the determined number of repetitions of a downlink transmission as another codepoint into the power headroom report content. Thus, the power headroom encodes the estimated number of repetitions to be performed by the user equipment for an uplink transmission to the base station and the determined number of repetitions necessary for successfully decoding a downlink transmission by the user equipment.

A further fourth embodiment of the present disclosure provides a method for power headroom reporting in a communication system, wherein a user equipment is communicating with a base station via a communication link. The UE determines a number of repetitions of a downlink transmission via the communication link from the base station necessary for the user equipment to successfully decode the downlink transmission, when the user equipment is operating in an enhanced coverage mode.

Upon being triggered to perform power headroom reporting, the UE prepares a power headroom report, and determines whether or not the user equipment is operating in the enhanced coverage mode. In case the user equipment is determined to operate in the enhanced coverage mode, the power headroom report is prepared by encoding the determined number of repetitions of a downlink transmission as a codepoint into the power headroom report content. The UE then transmits the power headroom report, including the codepoint encoding the determined number of repetitions of a downlink transmission, to the base station.

According to an advantageous variant of this fourth embodiment of the present disclosure which can be used in addition or alternatively to the above, the number of repetitions for a downlink transmission is one of a plurality of different repetition levels, predefined for being performed by the base station for a downlink transmission when the user equipment operates in the enhanced coverage mode.

According to an advantageous variant of this fourth embodiment of the present disclosure which can be used in addition or alternatively to the above, the base station receives the power headroom report from the user equipment and determines the number of repetitions for a downlink transmission, determined by the user equipment, from the content of the received power headroom report and based on the fact that the user equipment is operating in the enhanced coverage mode. The base station determines the number of repetitions to be performed by the base station for a downlink transmission via the communication link, at least based on the number of repetitions for a downlink transmission determined by the user equipment, and performs repetition of downlink transmissions based on the number of repetitions for a downlink transmission determined by the base station.

According to an advantageous variant of this fourth embodiment of the present disclosure which can be used in addition or alternatively to the above, the user equipment is configured for extended power headroom reporting, and the power headroom report, prepared by the user equipment and transmitted to the base station, is an extended power headroom report.

According to an advantageous variant of this fourth embodiment of the present disclosure which can be used in addition or alternatively to the above, the user equipment is a machine-type-communication, MTC, device.

According to an advantageous variant of this fourth embodiment of the present disclosure which can be used in addition or alternatively to the above, the UE estimates a number of repetitions to be performed by the user equipment for an uplink transmission via the communication link to the base station, when the user equipment is operating in the enhance coverage mode. In case the user equipment is determined to operate in an enhanced coverage mode, the power headroom report is prepared by encoding the estimated number of repetitions for an uplink transmission as another codepoint into the power headroom report content. Thus, the power headroom encodes the determined number of repetitions necessary for successfully decoding a downlink transmission by the user equipment and the estimated number of repetitions to be performed by the user equipment for an uplink transmission to the base station.

The above noted embodiment of the present disclosure also provides a user equipment for performing the method; the user equipment being configured for power headroom reporting in a communication system, wherein the user equipment is communicating with a base station via a communication link. A processor of the user equipment triggers and performs power headroom reporting. Upon being triggered to perform power headroom reporting, the processor determines whether or not the user equipment is operating in an enhanced coverage mode. The processor prepares a power headroom report, and in case the processor determines the user equipment is operating in the enhanced coverage mode, the power headroom report is prepared by including virtual power headroom information for the communication link. A transmitter of the user equipment transmits the prepared power headroom report to the base station.

According to an advantageous variant of this embodiment of the present disclosure which can be used in addition or alternatively to the above, and also as part of the second embodiment, the processor determines whether or not the user equipment is in a power-limited situation or not. The processor prepares the power headroom report by including the virtual power headroom information in case the user equipment is determined to be in a power-limited situation. Optionally, the processor includes into the virtual power headroom report a power-limitation indication when preparing the power headroom report for the communication link in case the user equipment is determined to be in a power-limited situation, the power-limitation indication being indicative for the base station that the user equipment is in a power-limited situation. Preferably, wherein a reserved bit of the power headroom report is used as the power-limitation indication.

According to an advantageous variant of this embodiment of the present disclosure which can be used in addition or alternatively to the above, a receiver of the UE receives a configuration message from the base station to configure the user equipment to not report channel state information or to reduce the periodicity of the channel state information reporting. Optionally, the configuration message further configures the user equipment to operate in the enhanced coverage mode.

According to an advantageous variant of this embodiment of the present disclosure which can be used in addition or alternatively to the above, wherein the user equipment is configured for extended power headroom reporting, and the power headroom report prepared by the processor of the user equipment prepares is an extended power headroom report.

According to an advantageous variant of this embodiment of the present disclosure which can be used in addition or alternatively to the above, the user equipment is a machine-type-communication, MTC, device.

According to an advantageous variant of this embodiment of the present disclosure which can be used in addition or alternatively to the above, the processor estimates a number of repetitions to be performed by the user equipment for an uplink transmission via the communication link to the base station, when the user equipment is operating in the enhanced coverage mode. In case the processor determines the user equipment operates in the enhanced coverage mode, the transmitter transmits a Media Access Control, MAC, control element including the estimated number of repetitions for an uplink transmission to the base station.

According to an advantageous variant of this embodiment of the present disclosure which can be used in addition or alternatively to the above, the processor determines the number of repetitions of a downlink transmission via the communication link from the base station, necessary for the user equipment to successfully decode the downlink transmission, when the user equipment is operating in the enhanced coverage mode. In case the processor determines the user equipment operates in the enhanced coverage mode, the transmitter transmits a Media Access Control, MAC, control element including the determined number of repetitions for successfully decoding a downlink transmission to the base station.

The third embodiment of the present disclosure further provides a user equipment to perform the method; the user equipment for power headroom reporting in a communication system, wherein the user equipment is communicating with a base station via a communication link. A processor of the UE estimates a number of repetitions to be performed by the user equipment for an uplink transmission via the communication link to the base station, when the user equipment is operating in an enhanced coverage mode. The processor triggers and performs power headroom reporting. Upon being triggered to perform power headroom reporting, the following is performed. The processor prepares a power headroom report, and determines whether or not the user equipment is operating in the enhanced coverage mode. In case the user equipment is determined to operate in the enhanced coverage mode, the processor prepares the power headroom report by encoding the estimated number of repetitions to be performed by the user equipment for an uplink transmission, as a codepoint into the power headroom report content. A transmitter of the UE transmits the prepared power headroom report, including the codepoint encoding the estimated number of repetitions for an uplink transmission, to the base station.

According to an advantageous variant of this third embodiment of the present disclosure which can be used in addition or alternatively to the above, the processor of the user equipment estimates the number of repetitions for an uplink transmission, based on at least one of pathloss of the communication link, ACK/NACK information for previous uplink transmissions to the base station, or interference measurements for the communication link.

According to an advantageous variant of this third embodiment of the present disclosure which can be used in addition or alternatively to the above, the number of repetitions for an uplink transmission is one of a plurality of different repetition levels, predefined for being performed by the user equipment for an uplink transmission when the user equipment is operating in the enhanced coverage mode.

According to an advantageous variant of this third embodiment of the present disclosure which can be used in addition or alternatively to the above, the processor triggers power headroom reporting, in case the user equipment is operating in the enhanced coverage mode and the estimated number of repetitions for an uplink transmission changes significantly.

According to an advantageous variant of this third embodiment of the present disclosure which can be used in addition or alternatively to the above, the processor determines a number of repetitions of a downlink transmission via the communication link from the base station, necessary for the user equipment to successfully decode the downlink transmission, when the user equipment is operating in the enhanced coverage mode. In case the processor determines the user equipment operates in the enhanced coverage mode, the processor prepares the power headroom report by encoding the determined number of repetitions of a downlink transmission as another codepoint into the power headroom report content.

The fourth embodiment of the present disclosure provides a user equipment for performing the method; the user equipment for power headroom reporting in a communication system, wherein the user equipment is communicating with a base station via a communication link. A processor of the UE determines a number of repetitions of a downlink transmission via the communication link from the base station, necessary for the user equipment to successfully decode the downlink transmission, when the user equipment is operating in an enhanced coverage mode. A processor of the UE triggers and performs power headroom reporting. Upon being triggered to perform power headroom reporting, the following steps are performed: The processor prepares a power headroom report, and determines whether or not the user equipment is operating in the enhanced coverage mode. In case the processor determines the user equipment operates in the enhanced coverage mode, the processor prepares the power headroom report by encoding the determined number of repetitions of a downlink transmission as a codepoint into the power headroom report content. A transmitter of the UE transmits the determined number of repetitions of a downlink transmission, to the base station.

According to an advantageous variant of this fourth embodiment of the present disclosure which can be used in addition or alternatively to the above, the number of repetitions for a downlink transmission is one of a plurality of different repetition levels, predefined for being performed by the base station for a downlink transmission when the user equipment is operating in the enhanced coverage mode.

According to an advantageous variant of this fourth embodiment of the present disclosure which can be used in addition or alternatively to the above, the processor estimates a number of repetitions to be performed by the user equipment for an uplink transmission via the communication link to the base station, when the user equipment is operating in the enhance coverage mode. In case the processor determines the user equipment operates in the enhanced coverage mode, the processor prepares the power headroom report by encoding the estimated number of repetitions for an uplink transmission as another codepoint into the power headroom report content.

A mobile station or mobile node or user equipment used in the claims and throughout the description of the present disclosure is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "MTC device" shall refer to a specific type of terminal or device characterized in that they are not operated by human beings and the communication peer is another machine, e.g. so called MTC server or another MTC terminal(s).

The term "radio link" or "communication link" used in the claims and throughout the description of the present disclosure is to be understood in a broad way as the radio connection between the mobile station and a base station; in the 3GPP it may be called component carrier or serving cell (e.g. Pcell, Scell).

The term "power headroom report" used in the claims and throughout the description of the present disclosure shall refer, for a particular embodiment of the present disclosure, to the power headroom report as defined in 3GPP, either to the PHR introduced with 3GPP Release 8 or preferably shall refer to the extended power headroom report as defined as of 3GPP Release 10.

The term "virtual power headroom report" used in the claims and throughout the description of the present disclosure shall refer, for a particular embodiment of the present disclosure, to the virtual power headroom report as defined in 3GPP; specifically, to the virtual power headroom report as defined for those cases where there is no actual PUSCH/PUCCH transmission. Similarly, the term "virtual power headroom information" shall be understood as referring to the content of the virtual power headroom report.

The term "enhanced coverage mode" used in the claims and throughout the description of the present disclosure shall refer to a mode of operation of a UE (or MTC device), as will be explained in the following. As has been explained to the end of the background section, a current work item "Low cost & enhanced coverage MTC UE for LTE" in discussed in 3GPP, and the above term "enhanced coverage mode" is taken therefrom. The term "enhanced coverage mode" is however not yet fixed in the standard, and may thus still change; the present disclosure shall of course also be applicable when another term is used in the standard. For the purposes of the present disclosure the actual term used is not important; rather, it is the characteristic when a UE is configured to operate in the "enhanced coverage mode" which is important.

In more detail, in general a UE is configured to operate in the "enhanced coverage mode" when the UE is in permanent poor radio conditions; this is the particularly the case for MTC devices (although the same conditions may also apply to normal mobile stations in specific situations) that are installed in the basement of residential buildings or locations shielded by foil-backed insulation, metalized windows or traditional thick-walled building construction, and thus will experience significantly greater penetration losses on the radio interface than normal LTE devices. Furthermore, such (MTC) devices will be basically stationary, i.e. will not be mobile (as a mobile phone) and will thus continue to experience the same poor radio conditions.

Therefore, one characteristic of the "enhanced coverage mode" is that it provides coverage enhancement techniques being applied/configured for MTC UEs which are in very poor radio conditions, such as repetition and/or power boosting, and/or TTI bundling (and/or possibly others). Such coverage enhancement techniques are for downlink and uplink channels, e.g. PDSCH/PUSCH. Since those enhancement coverage techniques may require a different UE/eNB behavior compared to Rel-11 LTE operation, i.e. different timing due to repetitions, it is important that UE and eNB are synchronized with respect to the usage of such coverage enhancement techniques. For example eNB will configure a MTC UE for operation in the "enhanced coverage mode".

Examples for alternative terminology may be: extended coverage mode, enhanced coverage operation, enhanced coverage, enhancements for coverage.

The term "power-limited situation" used in the claims and throughout the description of the present disclosure shall be understood as the situation in which the UE would have to transmit according to the power control formula with more uplink power than allowed by $P_{cmax}$, i.e. the total configured maximum output power; for instance, when the UE is in a power-limited situation, it transmits with its maximum power.

The term "codepoint" used in the claims and throughout the description of the present disclosure shall be understood as a particular bit combination, which can be associated with a particular meaning, e.g. according to one embodiment, with a particular repetition level.

In the following, several embodiments of the present disclosure will be explained in detail. It should be noted that the present disclosure may be advantageously used for example in a mobile communication system such as 3GPP LTE-A (Release 12) communication systems as described in the background section above. In this respect, the terminology of 3GPP LTE and/or LTE-A is employed throughout the description. Further, exemplary configurations are explored to detail the full breadth of the present disclosure.

The explanations should not be understood as limiting the present disclosure, but as a mere example of the present disclosure's embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure as such.

As explained at the end of the background section, a new work item is currently being discussed in 3GPP, namely "Low cost & enhanced coverage MTC UE for LTE", according to which a UE can be configured with enhancement techniques to extend the coverage. Correspondingly, it is expected that a UE (or MTC device) can be configured by the eNodeB in the respect. The eNB can decide to put a particular UE into the enhanced coverage mode, due to several reasons; for instance, in case the eNB learns (e.g. from power headroom reporting) that the UE is most of the time in or near to a power-limited situation, or in case the eNB knows that the UE is an MTC device installed in poor radio conditions (e.g. basement). A corresponding configuration message is then sent by the eNB to transit the UE into the enhanced coverage mode.

Such a scenario is mainly assumed for the present disclosure. However, the present disclosure shall not be restricted to this main scenario; for instance, the UE may also be configured differently to operate in the enhanced coverage mode.

In order to benefit from the power headroom reporting also for UEs in this particular scenario, the present disclosure provides different embodiments.

First Embodiment

Figure 10:
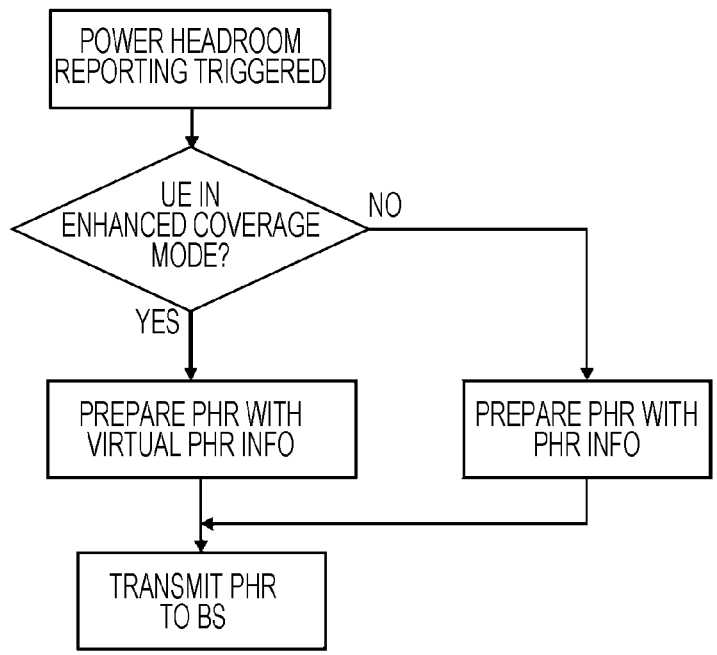
FIG. 10 is a sequence diagram for PHR operation at the UE according to a first embodiment.

A first embodiment of the present disclosure will be explained in connection with FIG. 10, which is a sequence diagram for the operation of the first embodiment of the present disclosure at the UE side. As apparent therefrom, the power headroom reporting as standardized is changed to take into account whether the UE is in enhanced coverage mode, in which case always the virtual power headroom is reported. Correspondingly, an additional check is included as to whether or not the user equipment is operating in the enhanced coverage mode.

At the beginning, the UE is triggered to report power headroom; i.e. the power headroom reporting procedure determines that one PHR has been triggered. This can be e.g. either of the standard triggers for power headroom reporting as defined already in the standard TS 36.321 subclause 5.4.6. The present disclosure however is not restricted thereto; the present disclosure functions also with any other trigger for starting the power headroom reporting procedure.

After the power headroom reporting procedure is triggered, the UE determines whether or not it is operating in the enhanced overage mode. In case the UE is operating in the enhanced coverage mode, the power headroom reporting procedure will always generate a virtual power headroom report, i.e. an extended PHR MAC CE including virtual power headroom information, such as the PHR MAC CE as depicted in FIG. 8 with the corresponding V-bits being set to 1. Put differently, independently from whether or not a PUSCH/PUCCH transmission exists or not in the subframe in which the power headroom shall be reported, always the virtual power headroom is reported to the eNB, according to the first embodiment of the present disclosure.

Conversely, in case the UE is not operating in the enhanced coverage mode, the standard power headroom reporting behavior is followed as explained in detail in the background section. Particularly, virtual power headroom information based on a reference PUSCH/PUCCH transmission or power headroom information is reported based on a real PUSCH, PUCCH transmissions.

In any case, after preparing the PHR MAC CE, with either the virtual power headroom information or with normal power headroom information, the UE transmits the thus-prepared PHR MAC CE to the eNB.

The virtual PHR conveys information on the pathloss $PL_c$ of the link between the UE and the eNB; as explained in the background section the value of the pathloss is available for the component carrier even without an uplink data transmission. The pathloss could be advantageously used by the eNB for scheduling purposes (e.g. for downlink scheduling). Since in the assumed scenario of the 3GPP work item the MTC devices are assumed to be mainly stationary (e.g. installed in the basement of a building), the channel information should not change rapidly (as compared to typical mobile environments). Consequently, slow-scale channel feedback can be sufficient for scheduling purposes in the eNB.

In advantageous embodiment, the pathloss gathered from the virtual power headroom report can thus be used instead of the channel state information. In that case, the UE could be configured to no longer report CSI, when operating in the enhanced coverage mode. Alternatively, the eNB may configure the UE with a longer periodicity for CSI reporting. In any case, the signaling overhead can be reduced, since the periodic CSI reporting on the PUCCH can be avoided (or at least reduced). Advantageously, this reconfiguration of the CSI reporting can be performed with the same message as used by the eNB to configure the UE to enter the enhanced coverage mode.

The above first embodiment is explained more specifically with reference to the technical standard in which it may be implemented. As just discussed, in case the UE determines that it is operating in the enhanced coverage mode, it shall always report the virtual power headroom, which may be calculated as follows (partly taken from the background section). The following formula could be used to calculate the virtual power headroom type 1:

$$PH_{virtual,c}(i) = P_{CMAX,H,c} - \{P_{O\_PUSCH}(j) + \alpha(j)*PL_c + f_c(i)\}$$

For calculating the virtual power headroom report, $$10 \log_{10}(M_{PUSCH}(i)) \text{ and } \Delta_{TF,c}(i)$$

in the expression of the normal power headroom report shown in the background section are set to zero. Values for the pathloss (PL), received TPC commands f(i) and other CC specific constants $$(P_{O\_PUSCH}(j), \alpha)$$

are available for the serving cell or respectively CC, even without UL data transmission. This can be seen as the power headroom assuming a default transmission configuration corresponding to the minimum possible resource assignment (M=1) and the modulation-and-coding scheme associated with $\Delta_{TF,c}(i) = 0$ dB.

The carrier-specific maximum transmission power $$\tilde{P}_{CMAX,c}(i)$$

is computed assuming MPR=0 dB, A-MPR=0 dB, P-MPR=0 dB and $\Delta T_C$=0 dB.

Essentially $$\tilde{P}_{CMAX,c}(i)$$

is equal to $P_{CMAX\_H,c} = \text{MIN}\{P_{EMAX,c}, P_{PowerClass}\}$.

Alternatively f(i), which is representing the received TPC commands, could be also set to zero for the calculation of the power headroom information reported by a mobile terminal when operating in enhanced coverage mode. Basically the following formula would be used for the calculation of the virtual power headroom reported by an MTC UE operating in the enhanced coverage mode:

$$PH_{virtual,c}(i) = P_{CMAX,H,c} - \{P_{O\_PUSCH}(j) + \alpha(j)*PL_c\}$$

The benefit of this alternative would be that a potential misalignment of the parameter $f_c(i)$ between UE and eNB caused by missed PDCCHs is not affecting the reported power headroom, i.e. there will be no misalignment between UE and eNB on the pathloss value.

Similar to Type-1 power headroom reporting, the Type-2 power headroom can also be reported for subframes in which no PUSCH and/or PUCCH is transmitted. In that case a virtual PUSCH and or PUCCH transmit power is calculated, assuming the smallest possible resource assignment (M=1) and $\Delta$MCS=0 dB for PUSCH and $$h(n_{CQI}, n_{HARQ}, n_{SR}), \Delta_{F\_PUCCH}(F), \Delta_{T \times D}(F')$$

set to 0 for PUCCH. The following formula is defined in TS 36.213 subclause 5.1.1.2 for calculating the type 2 virtual PHR.

$$PH_{type2}(i) = \tilde{P}_{CMAX,c}(i) - 10 \log_{10}\left(10^{(P_{O\_PUSCH,c}(1) + \alpha_c(1) \cdot PL_c + f_c(i))/10} + 10^{(P_{0\_PUCCH} + PL_c + g(i))/10}\right) [dB]$$

On the other hand, in case the UE determines that it does not operate in the enhanced coverage mode, the UE shall proceed to report the power headroom as defined before; i.e. reporting the virtual or normal power headroom as appropriate.

As defined by the technical standard 36.213 subclause 5.1.1.2, different formulas are used for calculating the PHR type 1 and type 2 depending on whether UE transmits PUSCH with or without PUCCH, or does not transmit PUSCH.

In the following there is one possible way to amend subclause "5.1.1.2 Power headroom" of TS 36.213, in order to implement the above-discussed first embodiment of the present disclosure; where the underlining is vis-a-vis
the subclause as defined by current TS 36.213 v12.0.0.

There are two types of UE power headroom reports defined. A UE power headroom PH is valid for subframe i for serving cell c.

Type 1:
If the UE transmits PUSCH without PUCCH in subframe i for serving cell c, power headroom for a Type 1 report is computed using $$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} [dB]$$

where,
$P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$
are defined in subclause 5.1.1.1.

If the UE transmits PUSCH with PUCCH in subframe i for serving cell c, power headroom for a Type 1 report is computed using $$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} [dB]$$

where,
$M_{PUSCH,c}(i)$, $P_{O\_PUSCH,c}(j)$, $\alpha_c(j)$, $PL_c$, $\Delta_{TF,c}(i)$ and $f_c(i)$
are defined in subclause 5.1.1.1.

$$\tilde{P}_{CMAX,c}(i)$$

is computed based on the requirements in [6] assuming a PUSCH only transmission in subframe i. For this case, the physical layer delivers $$\tilde{P}_{CMAX,c}(i)$$

instead of $P_{CMAX,c}(i)$ to higher layers.

If the UE does not transmit PUSCH in subframe i for serving cell c or the UE is configured to operate in the enhanced coverage mode, power headroom for a Type 1 report is computed using $$PH_{type1,c}(i) = \tilde{P}_{CMAX,c}(i) - \{P_{O\_PUSCH,c}(1) + \alpha_c(1) \cdot PL_c + f_c(i)\} \text{ [dB]}$$

where, $$\tilde{P}_{CMAX,c}(i)$$

is computed assuming MPR=0 dB, A-MPR=0 dB, P-MPR=0 dB and $\Delta T_C$=0 dB,
where
MPR, A-MPR, P-MPR and $\Delta T_C$
are defined in [6].
$P_{O\_PUSCH,c(1)}$, $\alpha_c(1)$, $PL_c$, and $f_c(i)$
are defined in subclause 5.1.1.1.
Type 2:
If the UE transmits PUSCH simultaneous with PUCCH in subframe i for the primary cell, power headroom for a Type 2 report is computed using $$PH_{type2}(i) = P_{CMAX,c}(i) - 10\log_{10}$$

$$\left( \begin{array}{c} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array} \right)$$

[dB]

where,
$P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$
are the primary cell parameters as defined in subclause 5.1.1.1 and
$P_{O\_PUCCH}$, $PL_c$, $h(n_{CQI}, n_{HARQ}, n_{SR})$, $\Delta_{F\_PUCCH}(F)$, $\Delta_{TxD}(F')$ and g(i)
are defined in subclause 5.1.2.1.
If the UE transmits PUSCH without PUCCH in subframe i for the primary cell, power headroom for a Type 2 report is computed using $$PH_{type2}(i) = P_{CMAX,c}(i) - 10\log_{10}$$

$$\left( \begin{array}{c} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + g(i))/10} \end{array} \right)$$

[dB]

where,
$P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$
are the primary cell parameters as defined in subclause 5.1.1.1 and $P_{O\_PUCCH}$, $PL_c$ and g(i) are defined in subclause 5.1.2.1.
If the UE transmits PUCCH without PUSCH in subframe i for the primary cell, power headroom for a Type 2 report is computed using $$PH_{type2}(i) = P_{CMAX,c}(i) - 10\log_{10}$$

$$\left( \begin{array}{c} 10^{(P_{O\_PUSCH,c}(1) + \alpha_c(1) \cdot PL_c + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array} \right)$$

[dB]

where,
$P_{O\_PUSCH,c}(1)$, $\alpha_c(1)$ and $f_c(i)$
are the primary cell parameters as defined in subclause 5.1.1.1, and
$P_{CMAX,c}(i)$, $P_{O\_PUCCH}$, $PL_c$, $h(n_{CQI}, n_{HARQ}, n_{SR})$, $\Delta_{F\_PUCCH}(F)$, $\Delta_{TxD}(F')$ and g(i)
are also defined in subclause 5.1.2.1.
If the UE does not transmit PUCCH or PUSCH in subframe i for the primary cell or the UE is configured to operate in the enhanced coverage mode, power headroom for a Type 2 report is computed using $$PH_{type2}(i) =$$

$$\tilde{P}_{CMAX,c}(i) - 10\log_{10}\left( \begin{array}{c} 10^{(P_{O\_PUSCH,c}(1) + \alpha_c(1) \cdot PL_c + f_c(i))/10} + \\ 10^{(P_{0\_PUCCH} + PL_c + g(i))/10} \end{array} \right) \text{ [dB]}$$

where, $$\tilde{P}_{CMAX,c}(i)$$

is computed assuming MPR=0 dB, A-MPR=0 dB, P-MPR=0 dB and $\Delta T_C$=0 dB,
where
MPR, A-MPR, P-MPR and $\Delta T_C$
are defined in [6],
$P_{O\_PUSCH,c}(1)$, $\alpha_c(1)$ and $f_c(i)$
are the primary cell parameters as defined in subclause 5.1.1.1 and $P_{O\_PUCCH}$, $PL_c$ and g(i) are defined in subclause 5.1.2.1.

The power headroom shall be rounded to the closest value in the range [40; −23] dB with steps of 1 dB and is delivered by the physical layer to higher layers. As will be explained more in detail in connection with the third and fourth embodiments, the first embodiment may furthermore report on a number of repetitions for an uplink transmission and/or for a downlink transmission; by using a MAC control element.

Second Embodiment

A second embodiment of the present disclosure is the same as the first embodiment, except that a further check is introduced into the PHR procedure to determine or not whether the UE is in a power-limited situation or not. Consequently, instead of always reporting the virtual power headroom when operating in the enhanced coverage mode, the UE further determines whether it is power-limited such that the UE always reports the virtual power headroom when it is both in enhanced coverage mode and also being power-limited.

Figure 11:
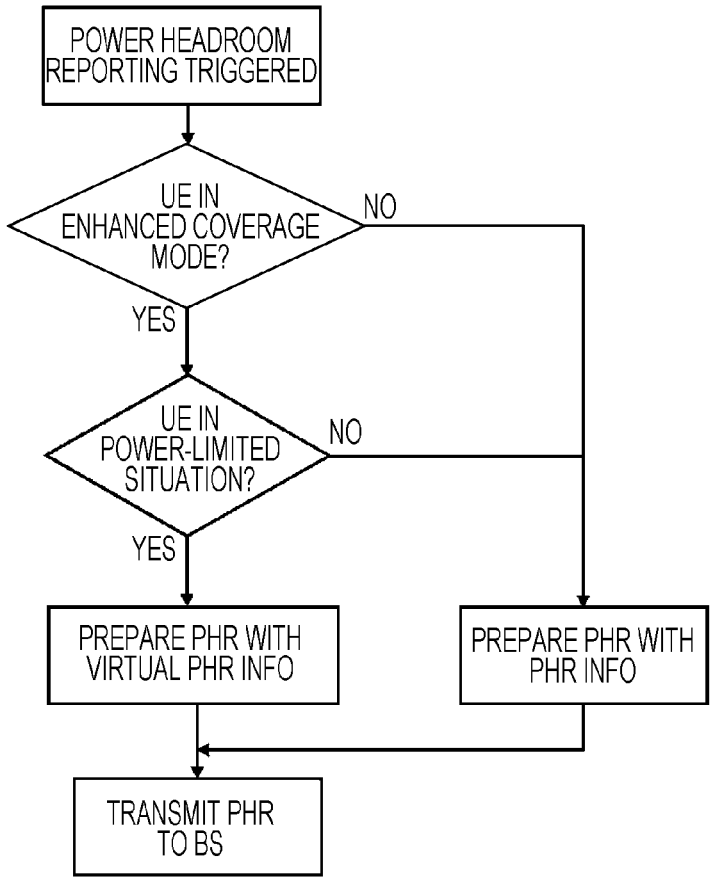
FIG. 11 is a sequence diagram for PHR operation at the UE according to a second embodiment.

The second embodiment will be explained in connection with FIG. 11, which is a sequence diagram for the PHR reporting procedure implemented in the UE.

As with the first embodiment, the UE according to the second embodiment will be eventually triggered to report its power headroom; e.g. by a periodic trigger. Upon being triggered to perform the power headroom reporting, two determinations will be performed by the UE; these may be performed sequentially (in either order) or in parallel. In detail, the UE determines whether or not it is operating in the enhanced overage mode. Furthermore, the UE determines whether it is in a power-limited situation or not.

In this particular case, the UE can determine whether it is power-limited or not, based on the power control formulas which determine the required power for the uplink channels, e.g. PUSCH/PUCCH; in case the required uplink transmission power for the uplink transmissions in this TTI, as a result of the power control formulas, exceeds or alternatively is equal to or exceeds $P_{cmax}$, i.e. the total configured maximum output power, the UE can be regarded as power limited.

In case the UE determines that it is operating in the enhanced coverage mode, and also is in a power-limited situation, the power headroom reporting procedure will always generate a virtual power headroom report, i.e. an extended PHR MAC CE including virtual power headroom information, such as the PHR MAC CE as depicted in FIG. 8 with the corresponding V-bits being set to 1. Put differently, independently from whether or not an uplink grant exists or not in the subframe in which the power headroom shall be reported, always the virtual power headroom is reported to the eNB, according to this second embodiment of the present disclosure.

Conversely, in case the UE is not operating in the enhanced coverage mode or in case the UE is not power-limited, the standard power headroom reporting behavior is followed as explained in detail in the background section. Particularly, a virtual power headroom or an extended power headroom is reported based on the available PUSCH, PUCCH transmissions. This normal PHR information could then be used for UL power control/scheduling in the eNB, as usual.

In any case, after preparing the PHR MAC CE, with either the virtual power headroom information or with normal power headroom information, the UE transmits the thus-prepared PHR MAC CE to the eNB.

Figures 12, 13:
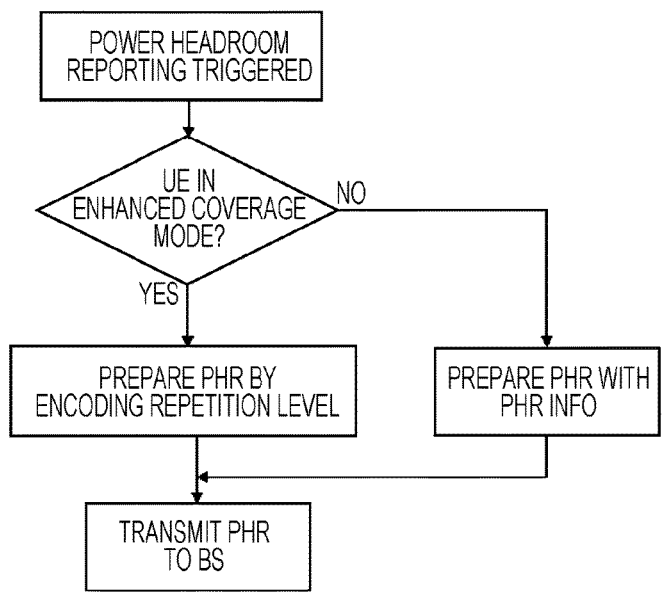
FIG. 12 illustrates an extended Power Headroom Report, ePHR, MAC control element, as already illustrated in FIG. 8, extended with a power-limitation indicator according to the second embodiment.
FIG. 13 is a sequence diagram for the PHR operation at the UE according to third and fourth embodiments.

According to a more specific and advantageous embodiment, the UE includes a power-limitation indication into the virtual power headroom report prepared in case the UE determines it is in a power-limited situation (and in the enhanced coverage mode). The power-limitation indication shall indicate to the recipient (i.e. the eNB) that the UE is power-limited. This allows the eNB to learn that the virtual power headroom was reported in view of the UE being in power limited and in the enhanced coverage mode, and not because the UE does not have a valid uplink resource allocation for calculating the normal power headroom information. In one specific example, the reserved bit in the first octet of the extended PHR MAC CE can be used, as depicted in FIG. 12.

As with the first embodiment, the eNB can derive pathloss information on the link from the virtual power headroom information; further detailed explanations are omitted in view that they are already provided in the first embodiment and apply equally to the second embodiment.

Similarly, the UE could be configured to no longer report CSI (channel state information), e.g. configured on PUCCH, when operating in the enhanced coverage mode. It can be assumed that the case where a UE in the enhanced coverage mode is not power limited is quite seldom. Therefore, even though the UE might not always transmit the virtual power headroom with the pathloss information, the periodic CSI reporting can be avoided. Alternatively, as with the first embodiment, the eNB may configure the UE with a longer periodicity for CSI reporting. Further detailed explanations are omitted in view that they are already provided in the first embodiment and apply equally to the second embodiment.

Also the explanations and details as to how to calculate the virtual power headroom (type 1 and type 2) and the extended power headroom information (type 1 and type 2) are omitted, in view that they are already provided in the first embodiment and apply equally to the second embodiment.

As will be explained more in detail in connection with third and fourth embodiments, the first embodiment may furthermore report on a number of repetitions for an uplink transmission and/or for a downlink transmission; by using a MAC control element.

Third and Fourth Embodiments

For the third and fourth embodiments the same scenario is assumed as for the first and second embodiments. In particular, a UE that can be configured to operate in an enhanced coverage mode, using corresponding enhancement techniques to extend coverage. Additionally, it is assumed that at least the technique of transmission repetition is used for UEs in the enhanced coverage mode. As explained in the background section, in the uplink and downlink a particular transmission can be repeated several times to make sure that the transmission can be decoded correctly at the receiver; this is similar to TTI bundling. Although not yet decided, it is expected that different repetition levels will be defined, such as 10, 20, 50 and 80; meaning that a particular uplink or downlink transmission is configured to be repeated 10, 20, 50 or 80 times, depending on the configuration. By soft combining the various repeated transmissions, a successful decoding is facilitated. Alternatively, instead of repeating the same transmission again and again, different redundancy version of one particular transmission can be transmitted; similar to the HARQ retransmissions. Although not yet decided, it may be expected that the control for the enhanced coverage mode and also for the configuration of the repetition technique will rest with the eNB, which will then configure the UE(s) accordingly. For the explanation of the third and fourth embodiments, it should be noted that the exact implementation of the enhanced coverage mode and, particularly, the repetition technique are still open to discussion. However, the principles as set out in the following for the third and fourth embodiments may apply nonetheless.

One idea behind the third and fourth embodiments is that the UE shall assist the eNB to properly configure the repetition technique in the uplink and/or downlink, by reusing the power headroom report to carry corresponding information to the eNB. FIG. 13 is a sequence diagram illustrating one particular implementation of the third and/or fourth embodiment.

As explained before, the embodiments outlined here are particularly suitable though not limited to MTC devices which are mostly stationary. Therefore, the channel information should not change rapidly as in typical mobile environments. On the other hand, some slow scale channel feedback may still be desirable for the eNB, e.g. due to changes in the environment. Basically the eNB should be made aware of large scale channel variations. Therefore, instead of designing a bundled transmission of PUCCH to feedback channel state information, the third and fourth embodiments show some further alternative channel feedback which is in particular beneficial for the scheduling of MTC devices with coverage enhancements.

According to the third embodiment, the UE shall estimate a number of repetitions or respectively bundle size for an uplink transmission to the eNB, i.e. the number of times the UE shall repeat each uplink transmission to the eNB. The UE can perform the estimation based on different information; the following are mere examples on information which could be used in the respect: pathloss information of the serving cell to the eNB, ACK/NACKs received by the UE from the eNB for previous uplink transmissions via the serving cell, interference measurements performed by the UE for the serving cell.

The UE can either estimate an exact number of repetitions, or can preferably already match same with the particular repetition level. The UE may also perform the estimation in a periodic manner, similar to pathloss measurements; i.e. independent from the PHR operation, for which reason FIG. 13 is depicted exemplary without the step of estimating the repetition level for an uplink transmission. This has the advantage that an average of a various previously-estimated number of uplink transmission repetitions can be computed, with a more reliable result than when using only one particular value. Alternatively, the UE may also only perform the estimation when it is triggered for power headroom reporting, in which case the power headroom reporting procedure would include the further step of estimating the number of uplink transmission repetitions. For the further illustration, it is assumed that the UE runs a parallel procedure for estimating the number of uplink transmission repetitions.

According to the fourth embodiment, the UE shall determine the number of repetitions of a downlink transmission from the eNB or respectively the DL bundle size that are necessary for the UE to successfully decode the downlink transmission. The eNB will begin with a high number of downlink repetitions in order to make sure that the UE is able to successfully decode the downlink transmission. However, the eNB may transmit much many repetitions than are actually needed, which wastes resources. It is thus advantageous if the UE determines how many of the repetitions were actually used until finally decoding the downlink transmission successfully. For instance, the UE may try repeatedly to decode a downlink transmission; e.g. every 10 transmission, combining 10, 20, 30, 40 etc. transmissions, until the downlink transmission could be correctly decoded. The UE shall thus monitor the number of downlink transmission repetition that were needed, and store this information for later use (i.e. when being triggered for PHR reporting).

Alternatively the UE could determine and report a suitable DL bundle size or respectively number of DL repetition based on pathloss, interference measurements and also considering the decoding performance of the UE, i.e. implementation specific information. This information would be similar to the CSI feedback provided by the UE to the eNB for DL scheduling, i.e. CSI basically suggests a suitable MCS to the eNB for Downlink transmissions. Instead of MCS the UE would report a suitable DL bundle size to the eNB.

Consequently, the UE may perform this determination in a periodic manner, similar to pathloss measurements; i.e. independent from the PHR operation, for which reason FIG. 13 is depicted exemplarily without the step of determining the downlink transmission repetition level. Alternatively, the UE may also only perform the determination of the downlink transmission repetition when it is triggered for power headroom reporting, in which case the power headroom reporting procedure would include the corresponding step. For the further illustration, it is assumed that the UE runs a parallel procedure for determining the number of downlink transmission repetitions.

As with the first and second embodiments, it is assumed that the UE is triggered to perform power headroom reporting; this can be e.g. either of the standard triggers for power headroom reporting as defined already in the standard TS 36.321 subclause 5.4.6. Alternatively, a further trigger event will be introduced later in connection with a change of the uplink/downlink repetition level. The present disclosure however is not restricted thereto; the present disclosure functions also with any other trigger for starting the power headroom reporting procedure.

After a power headroom is triggered, the UE determines whether or not it is operating in the enhanced overage mode.

Although not depicted in FIG. 13, the sequence for the third and fourth embodiments may advantageously include the step of determining whether the UE is in a power-limited situation, in the same manner as introduced for the second embodiment. The idea behind this additional check is the same as for the second embodiment, namely that the PHR shall only be re-used for carrying the repetition level(s) when it is of limited use for the normal power control, namely when the UE is power-limited.

In case the UE is operating in the enhanced coverage mode, the power headroom report is prepared such that the power headroom report encodes the estimated number of uplink transmission repetitions and/or the number of downlink transmission repetitions, instead of the usual power headroom information. This may be accomplished in various different ways; only some of them are explained in the following.

Different codepoints can be defined for the power headroom report which are then used to encode the various repetition (levels). FIGS. 14, 15 and 16 illustrate different codepoints for the PH field (either type 1 or type 2) of the PHR MAC CE (see FIG. 8). Subclause 6.1.3.6a "Extended Power Headroom Report MAC Control Element" defines the content of the PH field as having 6 bits and indicating the power headroom level.

It is exemplarily assumed that four different repetition levels are assumed for uplink and downlink transmission repetitions; namely, level 1 with 10 repetitions, level 2 with 20 repetitions, level 3 with 50 repetitions, and level 4 with 80 repetitions. Accordingly, four PH values are re-used and associated with the corresponding repetition levels; for instance, the four values with the less likely power headroom values can be re-defined for the purpose, i.e. with respect to MTC devices in the enhanced coverage mode, those values that represent the highest power headroom. In the particular example of FIGS. 14 and 15, the PH with values 0, 1, 2, and 3 are used. In FIG. 16, 8 values are re-defined for the purpose of encoding the different repetition levels for the uplink and downlink; for instance, the type 1 PH field could be used to transport the uplink repetition level, while the type 2 PH field could be used to transport the downlink repetition level.

Another option is to use the $P_{cmax}$ field of the PHR, or the C-bits in the subheader to encode the repetition levels. In both cases 6 bits are available, which can used to predefine different codepoints encoding the uplink and/or downlink repetition levels.

In any case, how the UE encodes the different repetition levels into the PHR is known to the eNB, which can then, upon receiving the PHR, determine the repetition levels as informed by the UE. In particular, the eNB knows that the UE is in the enhanced coverage mode, and thus will reuse the PHR procedure to transmit information on the repetition levels; correspondingly, the eNB can decode the codepoints in the PHR appropriately.

In the other case, where the UE determines that it is not operating in the enhanced coverage mode, the standard power headroom reporting behavior is followed as explained in detail in the background section. Particularly, a virtual power headroom or an extended power headroom is reported based on the available PUSCH, PUCCH transmissions.

Finally, after preparing the PHR MAC CE in this way, the UE transmits the thus-prepared PHR to the eNB.

The eNB can derive the estimated number of uplink transmission repetition (level) and/or the determined number of downlink transmission repetition (level) from the received PHR, since the eNB knows that the UE is operating in the enhance coverage mode. The eNB may use same to properly determine the repetition configuration in the uplink and/or downlink. In both cases, the values transmitted by the UE to the eNB may be considered mere suggestions, which the eNB can accept or not.

The third and fourth embodiments can be performed by the UE separately on its own or in a combined manner.

Advantageously, according to an improved implementation, an additional trigger for performing power headroom reporting when the UE is in the enhanced coverage mode is defined. In particular, it is assumed that the UE periodically determines the number of uplink and/or downlink transmission repetitions, as explained above for the third and fourth embodiments, respectively. When the UE determines a significant change in the number of repetitions for either downlink or uplink for examples caused by a significant change in the pathloss or interference situation, it may trigger power headroom reporting such that this change of repetition is informed to the eNB. Accordingly, the UE starts the power headroom reporting as explained in connection with FIG. 13, and thus encodes either the uplink transmission repetition, or downlink transmission repetition, or both, into the PHR content as one or several codepoints. A significant change may be for instance, when the repetition level changes for the uplink or downlink.

In variants of the third and fourth embodiments, instead of re-using the power headroom for reporting the number of repetitions for uplink and/or downlink, a MAC control element could be used in the respect. In particular, MAC CE can be defined for transporting the PUSCH repetition level, the PDSCH repetition level, or both the PDSCH and PUSCH repetition level. This can be seen in FIGS. 17-19, which illustrate the MAC CE structures as just explained.

When using MAC CEs to transport this information (i.e. repetition levels for uplink/downlink), the third and fourth embodiments can be combined with either of the first and second embodiments explained above, such that the PHR may be prepared to always include the virtual power headroom information when in the enhanced coverage mode (optionally and when also power-limited) while also transmitting one or more MAC CE with the corresponding information on the number of repetitions for the uplink/downlink.

Hardware and Software Implementation

Another embodiment of the present disclosure relates to the implementation of the above described various embodiments using hardware and software, or hardware only. In this connection the present disclosure provides a user equipment (mobile terminal). The user equipment is adapted to perform the methods described herein.

It is further recognized that the various embodiments of the present disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. In addition, a radio transmitter and a radio receiver and other necessary hardware may be provided in the apparatuses (UE, MeNB, SeNB). The various embodiments of the present disclosure may also be performed or embodied by a combination of these devices.

Further, the various embodiments of the present disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the present disclosure may individually or in arbitrary combination be subject matter to another embodiment.

It would be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

What is claimed is:

1. A method for power headroom reporting in a communication system, in which a user equipment is communicating with a base station via a communication link, the method comprising:

detecting, by the user equipment, a trigger to perform the power headroom reporting;

in response to detecting the trigger, determining, by the user equipment, whether or not the user equipment is operating in an enhanced coverage mode;

preparing, by the user equipment, a power headroom report, wherein, in response to determining that the user equipment is operating in the enhanced coverage mode, the power headroom report is prepared by including, in the power headroom report, virtual power headroom information that is used for cases where there is no actual Physical Uplink Shared Channel (PUSCH)/Physical Uplink Control Channel (PUCCH) transmission, and wherein, in response to determining that the user equipment is not operating in the enhanced coverage mode, the power headroom report is prepared by including, in the power headroom report, power headroom information for the communication link; and transmitting, by the user equipment, the prepared power headroom report to the base station.

2. The method according to claim 1, further comprising:

in response to detecting the trigger, determining, by the user equipment, whether or not the user equipment is in a power-limited situation, wherein, in response to determining that the user equipment is operating in the enhanced coverage mode and is in the power-limited situation, the power headroom report is prepared by including, in the power headroom report, the virtual power headroom information for the communication link and a power-limitation indication, the power-limitation indication being indicative for the base station that the user equipment is in the power-limited situation.

3. The method according to claim 2, wherein, in response to determining that the user equipment is not in the power-limited situation, the power headroom report is prepared by including, in the power headroom report, power headroom information calculated based on an uplink grant on the communication link.

4. The method according to claim 1, further comprising:
in response to determining that the user equipment is operating in the enhanced coverage mode, reducing a periodicity of channel state information reporting.

5. The method according to claim 1, wherein the power headroom report is an extended power headroom report.

6. A method for power headroom reporting in a communication system, in which a user equipment is communicating with a base station via a communication link, the method comprising:
estimating, by the user equipment, a number of repetitions to be performed by the user equipment for an uplink transmission via the communication link to the base station;
detecting, by the user equipment, a trigger to perform the power headroom reporting;
in response to detecting the trigger, determining, by the user equipment, whether or not the user equipment is operating in an enhanced coverage mode;
preparing, by the user equipment, a power headroom report,
wherein, in response to determining that the user equipment is operating in the enhanced coverage mode, the power headroom report is prepared by encoding the estimated number of repetitions for the uplink transmission as a codepoint into the power headroom report, and
wherein, in response to determining that the user equipment is not operating in the enhanced coverage mode, the power headroom report is prepared by including, in the power headroom report, power headroom information for the communication link; and
transmitting, by the user equipment, the prepared power headroom report to the base station.

7. The method according to claim 6, wherein the user equipment estimates the number of repetitions for the uplink transmission; based on at least one of:
pathloss of the communication link, ACK/NACK information for previous uplink transmissions to the base station, or interference measurements for the communication link.

8. The method according to claim 6, wherein the number of repetitions for the uplink transmission is one of a plurality of different repetition levels that are predefined for being performed by the user equipment for the uplink transmission.

9. The method according to claim 6, wherein the user equipment is triggered to perform power headroom reporting based on a change in the estimated number of repetitions for the uplink transmission to be performed by the user equipment.

10. A method for power headroom reporting in a communication system, in which a user equipment is communicating with a base station via a communication link, the method comprising:
determining, by the user equipment, a number of repetitions of a downlink transmission via the communication link from the base station that is necessary for the user equipment to successfully decode the downlink transmission;
detecting, by the user equipment, a trigger to perform the power headroom reporting;
in response to detecting the trigger, determining, by the user equipment, whether or not the user equipment is operating in an enhanced coverage mode;
preparing, by the user equipment, a power headroom report,
wherein, in response to determining that the user equipment is operating in the enhanced coverage mode, the power headroom report is prepared by encoding the determined number of repetitions of the downlink transmission as a codepoint into the power headroom report, and
wherein, in response to determining that the user equipment is not operating in the enhanced coverage mode, the power headroom report is prepared by including, in the power headroom report, power headroom information for the communication link; and
transmitting, by the user equipment, the prepared power headroom report to the base station.

11. A user equipment configured for power headroom reporting in a communication system, in which the user equipment is communicating with a base station via a communication link, the user equipment comprising:
a processor, which, in operation:
detects a trigger to perform the power headroom reporting;
determines, in response to the trigger being detected, whether or not the user equipment is operating in an enhanced coverage mode; and
prepares a power headroom report,
wherein, in response to the user equipment being determined to be operating in the enhanced coverage mode, the power headroom report is prepared by including, in the power headroom report, virtual power headroom information that is used for cases where there is no actual Physical Uplink Shared Channel (PUSCH)/Physical Uplink Control Channel (PUCCH) transmission, and
wherein, in response to the user equipment being determined to not be operating in the enhanced coverage mode, the power headroom report is prepared by including, in the power headroom report, power headroom information for the communication link; and
a transmitter, which, in operation, transmits the prepared power headroom report to the base station.

12. The user equipment according to claim 11, wherein the processor, in operation, determines whether or not the user equipment is in a power-limited situation,
wherein, in response to the user equipment being determined to be operating in the enhanced coverage mode and in the power-limited situation, the power headroom report is prepared by including, in the power headroom report, the virtual power headroom information and a power-limitation indication, the power-limitation indication being indicative for the base station that the user equipment is in the power-limited situation.

13. A user equipment for power headroom reporting in a communication system, in which the user equipment is communicating with a base station via a communication link, the user equipment comprising:
a processor, which, in operation:
estimates a number of repetitions to be performed by the user equipment for an uplink transmission via the communication link to the base station;

detects a trigger to perform the power headroom reporting;

determines, in response to the trigger being detected, whether or not the user equipment is operating in an enhanced coverage mode; and prepares a power headroom report, wherein, in response to the user equipment being determined to be operating in the enhanced coverage mode, the power head room report is prepared by encoding the estimated number of repetitions to be performed by the user equipment for the uplink transmission, as a codepoint into the power headroom report, and wherein, in response to the user equipment being determined to not be operating in the enhanced coverage mode, the power headroom report is prepared by including, in the power headroom report, power headroom information for the communication link; and a transmitter, which, in operation, transmits the prepared power headroom report to the base station.

14. The user equipment according to claim 13, wherein the processor, in operation, triggers the power headroom reporting based on a change in the estimated number of repetitions for the uplink transmission.

15. A user equipment for power headroom reporting in a communication system, in which the user equipment is communicating with a base station via a communication link, the user equipment comprising:

a processor, which, in operation:

determines a number of repetitions of a downlink transmission via the communication link from the base station that is necessary for the user equipment to successfully decode the downlink transmission;

detects a trigger to perform the power headroom reporting;

determines, in response to the trigger being detected, whether or not the user equipment is operating in an enhanced coverage mode; and prepares a power headroom report, wherein, in response to the user equipment being determined to be in the enhanced coverage mode, the power headroom report is prepared by encoding the determined number of repetitions of the downlink transmission as a codepoint into the power headroom report, and wherein, in response to the user equipment being determined to not be operating in the enhanced coverage mode, the power headroom report is prepared by including, in the power headroom report, power headroom information for the communication link; and a transmitter, which, in operation, transmits the prepared power headroom report to the base station.

16. The method according to claim 1, wherein the user equipment is a machine-type-communication (MTC) device.

* * * * *